United States Patent
Schemmann et al.

(10) Patent No.: US 6,728,117 B2
(45) Date of Patent: Apr. 27, 2004

(54) FREQUENCY MODULATED SELF-OSCILLATING SWITCHING POWER SUPPLY

(75) Inventors: Marcel F. C. Schemmann, Echt (NL); Lee Chappell, Church Hill, TN (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 218 days.

(21) Appl. No.: 10/035,699

(22) Filed: Oct. 23, 2001

(65) Prior Publication Data

US 2003/0128555 A1 Jul. 10, 2003

(51) Int. Cl.[7] .............................. H02M 3/335
(52) U.S. Cl. .................. 363/21.12; 363/21.16; 363/21.17; 363/21.18
(58) Field of Search ................. 363/16, 21.01, 363/21.12, 21.13, 21.14, 21.15, 21.16, 21.17, 21.18, 97

(56) References Cited

U.S. PATENT DOCUMENTS

| | | | | |
|---|---|---|---|---|
| 5,818,703 | A | * 10/1998 | Jacobson | 363/21.13 |
| 6,115,265 | A | * 9/2000 | Barlage | 363/21.17 |
| 6,232,752 | B1 | 5/2001 | Bissell | |
| 6,232,755 | B1 | 5/2001 | Zhang | |
| 6,233,161 | B1 | 5/2001 | Balakrishnan et al. | |
| 6,239,585 | B1 | 5/2001 | Buono | |
| 6,252,783 | B1 | 6/2001 | Huh et al. | |
| 6,255,804 | B1 | 7/2001 | Herniter et al. | |
| 6,256,213 | B1 | 7/2001 | Illingworth | |

OTHER PUBLICATIONS

High Voltage GreenLine Power Factor Controller, Semiconductor Components Industries, LLC 2000; Aug. 2000—Rev. 5, 20 pages.
Christopher Baso, Motorola Semiconductors—Critical–Mode Control Stabilizes Switch–Mode Power Supplies, 7 pages (no date).
Petr Lidak, Critical Conduction Mode, Flyback Switching Power Supply Using The MC33364, Motorola Ltd., 1998 (no month).

* cited by examiner

*Primary Examiner*—Jessica Han
(74) *Attorney, Agent, or Firm*—Michael E. Belk

(57) ABSTRACT

A switching power supply that can operate in critical conduction mode as self-oscillating power supply (SOP) during moderate load, and in discontinuous conduction mode (DCM) under the control of a pulse-width modulated signal under small load, whereby the power consumption of the supply is decreases continuously as the load is decreased. A frequency modulated self-oscillating switching power supply (FMSOP) having a power switch, the switch being held OFF, after a zero-current detector detects that an output current falls to zero, until allowed to turn ON after a pulse having a load-modulated width that corresponds to the load. The FMSOP operates with a switch controller that may include a flip-flop to latch the detector's signal, a load-modulated pulse generator, and a combinatorial logic gate to combine the pulse and the latched signal.

20 Claims, 12 Drawing Sheets

FREQUENCY MODULATED SELF-OSCILLATING SWITCHING POWER SUPPLY

BACKGROUND OF THE INVENTION

1. Technical Field

This invention relates generally to a power supply, more particularly, to a self-oscillating switching power supply (SOP) adapted to supply DC current to wide range of loads.

2. Related Art

A switch-mode power supply (SMPS) can operate in or between two current-conduction modes, continuous conduction mode (CCM), and discontinuous conduction mode (DCM). By controlling the power switch with a flyback (feedback signal) to monitor the energy (e.g., current) remaining in an inductor coil, a self-oscillating switching power supply (SOP) can operate at the critical-conduction point between the continuous and discontinuous conduction modes, wherein the power supply begins a new switching cycle at the exact point in time when an output-current inductor coil's (e.g., a transformer's secondary coil's) current (i.e., energy) falls to zero (i.e., approaches zero or is zero). A self-oscillating (flyback-driven) switching power supply (SOP) will include an input-current inductor coil and an output-current inductor coil, but may be implemented with or without a transformer. In a transformer-less (i.e., no transformer) SOP, the input-current inductor coil will also be the output-current inductor coil (e.g., a there will be only a single inductor coil for energy input and output).

FIG. 1A is circuit diagram depicting a typical topology of a transformer (T1)-based self-oscillating (i.e., flyback) switching power supply (SOP) 100 of the related art. The SOP 100 includes a power switch SW1 for interrupting a current $I_1$ through an input-current inductor coil (e.g., primary winding L1 of transformer T1). The power switch SW1 may be implemented as a metal oxide semiconductor field effect transistor (MOSFET) or a insulated gate bipolar transistor (IGBT), or a mechanical switch, etc, or by any suitable presently know or future electrical current-switching device. The power switch SW1 has two states, an "ON" state characterized by a low impedance, and an "OFF" state characterized by a high impedance. The power switch SW1 is generally cyclically turned ON and OFF in a periodic manner, such that the power switch SW1 is ON during a first "ON-time" period and then OFF during a first "OFF-time" period, and then ON again during a second "ON-time" period ($t_{ON}$) and then OFF during a second "OFF-time" period ($t_{OFF}$), and so forth. The switching frequency $F_{SW}$ of the SOP 100 is calculated as the inverse of the sum of the ON-time plus the subsequent OFF-time (i.e., $F_{SW}$=1/("ON-time"+"OFF-time"). The duty cycle ($Q_S$) of the SOP 100 is calculated as the ratio of the ON-time to the sum of the ON-time plus the subsequent OFF-time (i.e., $Q_S$="ON-time"/("ON-time"+"OFF-time")).

In general, because there is inductive energy storage in the SOP 100, and a capacitance associated with the GATE terminal of the power switch SW1, a "minimum ON-time" ($t_{ONMIN}$) will be characterized by the characteristics of the power switch SW1 and other characteristics of the SOP 100. During normal operation (e.g., critical conduction mode operation) of the SOP 100, the OFF-time will be characterized by (and equal to) the time it takes for the current (i.e., energy) in an output inductor coil (e.g., a transformer secondary coil L2 and/or transformer auxiliary secondary coil L3) to fall to zero (i.e., to approach zero or to be zero).

During any discontinuous conduction mode (DCM) operation of the SOP 100, the OFF-time will be longer than the time it takes for the current (i.e., energy) in an output inductor coil (e.g., a transformer secondary coil L2 and/or transformer auxiliary secondary coil L3) to fall to zero. During any continuous conduction mode (CCM) operation of the SOP 100, the OFF-time will be substantially less than the time it would otherwise take for the current (i.e., energy) in an output inductor coil (e.g., a transformer secondary coil L2 and/or transformer auxiliary secondary coil L3) to fall to zero, and the current will not fall all the way to zero.

The power switch SW1 is gated (i.e. controlled ON and OFF) by a switch-control signal asserted on the GATE node of the power switch SW1 by a switch-driver circuit, such as the Frequency Clamped Flyback Driver 110. Frequency clamped flyback switch driver 110 can be implemented with an integrated circuit chip manufactured by Motorola Corp. known as an MC33364 critical-conduction mode controller chip (See, e.g., FIG. 1C).

The power switch SW1 alternately opens and closes, alternately passing and interrupting an input current ($I_1$) which is driven through the transformer's primary coil L1 by the voltage potential difference ($V_1$) between a power source input voltage $V_{IN}$ and power switch SW1. (In most real circuits, the ON resistance of the power switch SW1 will be negligibly small, such that $V_1$ is approximately equal to voltage $V_{IN}$ when the power switch SW1 is closed). Power source voltage $V_{IN}$ may be a fixed DC voltage or a variable DC voltage (e.g., a DC voltage having a ripple due to lack of filtering of a rectified AC). Persons skilled in the art will recognize that $V_{IN}$ may be provided as a substantially direct current (DC) voltage produced from an alternating current (AC) input voltage (i.e., a line voltage) source via a diode bridge rectifier (not shown) that full-wave rectifies the alternating current and a filter capacitor (not shown) that filters and smooths current pulses received from the bridge rectifier.

The SOP 100 includes an input-current inductor coil (e.g., primary winding L1) connected in series with a power switch SW1 and between a power source ($V_{IN}$) and a reference potential (ground). As is commonly known, closing and opening of the power switch SW1 causes energy to be stored as a magnetic field in the input-current inductor coil (e.g., in the primary winding L1) which is transferred to an output-current inductor coil (e.g, the magnetically coupled secondary winding L2) and thereupon output substantially as an output current ($I_2$) driven at a secondary voltage $V_2$ and dissipated through a load associated with an impedance, and/or with a resistance ($R_{LOADEQ}$). A very small, (i.e., negligible) amount of the input energy is output as an auxiliary output current ($I_{AUX}$) and dissipated through a sensing circuit within or operatively coupled to the switch-driver circuit (e.g, 110). Because the transformer-based SOP 100 operates by transferring energy between the primary and secondary windings L1 and L2, the turns ratio $N_T$ of the windings L1 and L2 may be adjusted to either increase or decrease the output voltage ($V_{OUT}$) associated with the power source $V_{IN}$, as needed for a particular application. A rectifier diode D1, and a filter capacitor C1 are connected to output-current inductor coil (e.g, secondary winding L2) as shown in FIG. 1A. The rectifier diode D1 rectifies the current pulses ($I_2$) provided by the output-current inductor coil (e.g, secondary winding L2) and the filter capacitor C2 filters and smooths the rectified current pulses to form a substantially direct current (DC) output voltage $V_{OUT}$.

The transformer T1 includes a primary winding (L1) (connected in series to the power switch SW1), and at least one secondary winding (e.g., L2 and/or L3). A first secondary winding L2 is provided to output at voltage $V_2$ all, or substantially all, of the energy input to the transformer T1 (e.g., energy input as current $I_1$ in the primary winding L1 at voltage $V_1$). The voltages $V_1$ and $V_2$ are generally related by the equation $V_2=N_T*V_1$. An auxiliary secondary winding L3 is provided to output, at voltage $V_{AUX}$, a very small portion, (i.e., a negligible amount or none) of the energy input to the transformer T1. The voltage $V_{AUX}$ across the auxiliary secondary winding L3 is related to the voltage across the first secondary winding L2 by the ratio of turns in each of coils L2 and L3 (when the current $I_2$ is decaying in coil L2). Therefore, voltage $V_{AUX}$ is a fixed proportion of $V_2$ (when a current is flowing in coil L2). When the power switch SW1 is OFF (e.g., following an ON-time), and while energy is being dissipated as a decaying (but non-zero) current $I_2$ in the first secondary winding L2, the voltage $V_{AUX}$ will be non-zero. The magnitude of the voltage $V_{AUX}$ will approach zero (or be zero) at the moment that the current $I_2$ falls to zero. At that moment, during normal (critical conduction mode) operation of the SOP 100, power switch SW1 will be closed, and thereafter, the voltage $V_{AUX}$ will be affected by the voltage $V_1$ and the current $I_1$ across the primary winding L1.

By using the voltage $V_{AUX}$, and/or associated current $I_{AUX}$ as a feedback (i.e., flyback) signal to the switch-driver circuit (e.g., 110), the SOP 100 can operate in critical conduction mode, wherein the next conduction (i.e., ON-time) of the next cycle is initiated by a Zero Current Detector operatively connected to the auxiliary winding L3. The Zero Current Detector is a circuit for detecting (or anticipating) the occurrence of a zero-current condition in the output-current inductor coil (e.g, secondary winding L2). Various other known alternative methods and circuits for detecting the zero-current condition of the output current $I_2$ in the output-current inductor (L2) can be substituted in the SOP 100 to sustain critical conduction mode operation.

As is understood by persons skilled in the art, the conduction (i.e., ON-time) of current ($I_1$), of each cycle, is terminated when the peak inductor current $I_1$ reaches a threshold level ($I_{TH}$), as performed by circuits known to persons skilled in the art. The threshold level $I_{TH}$ may be dynamically varied (e.g., for power factor correction) by use of a Multiplier output for comparing to a feedback signal commensurate with the current $I_1$. The Zero Current Detector within (as shown) or associated with or connected to the switch driver (e.g., 110) may indirectly sense a zero-current condition of current $I_2$ in the output-current inductor coil (e.g, secondary winding L2) by monitoring an auxiliary voltage $V_{AUX}$ across a magnetically coupled coil (e.g., auxiliary winding L3).

FIG. 1B is a timing diagram depicting currents and voltages in the SOP 100 of FIG. 1A while operating for several cycles in critical conduction mode. FIG. 1B illustrates the method of the critical-conduction mode operation of the SOP 100 of FIG. 1A. FIG. 1B shows the general shape of the currents $I_1$ and $I_2$ flowing through the coils L1 and L2, and of feedback voltage $V_{AUX}$ during a few representative cycles. When the power switch (SW1 of FIG. 1A) closes, a voltage $V_1$ (i.e., $V_1$ is approximately equal to voltage $V_{IN}$) is asserted across coil L1 and current $I_1$ ramps up (from zero at the end of the previous cycle), until a threshold current magnitude $I_{TH}$ is reached. During this first ON-time ($t_{ON1}$), a magnetic field builds up in the core (e.g., $T_{CORE}$) of the input current inductor (e.g., the core of coil L1, which is shared with coils L2 and L3). When the power switch SW1 opens, which begins the OFF-time ($t_{OFF1}$), the magnetic field collapses, and, according to Lenz's law, the voltage $V_1$ across the input-current inductor (L1) reverses. In this case, the current ($I_1$) has to find some way to continue its flow and begin its decrease—for example, as current $I_2$ by magnetic coupling through the core $T_{CORE}$ of transformer T1.

Time $t_{AUX}$ is the time required for the current $I_2$ in the output-current inductor coil L2 to fall to zero, sensed as the voltage $V_{AUX}$ across the auxiliary secondary coil L3 approaching zero. If the power switch SW1 turns ON again during the ramp-down phase and before the current $I_2$ reaches zero (i.e., $t_{OFF}$ is less than $t_{AUX}$), then the supply 100 is operating in continuous-conduction mode (CCM). Alternatively, if the energy-storage capability of the input-current inductor coil (e.g., L1) is such that its magnetically coupled current $I_1/I_2$ dries out to zero during the switch's OFF-time (i.e., $t_{OFF}$ greater than $t_{AUX}$), the supply 100 is operating in discontinuous-conduction mode (DCM). The amount of "dead time" (the difference that $t_{OFF}$ exceeds $t_{AUX}$) for which the magnetically coupled current $I_1/I_2$ stays at a null level defines how strongly the supply 100 operates in DCM. If the current through the coil L2 reaches zero and the power switch SW1 turns on immediately (no dead time), the supply 100 operates in critical-conduction mode.

The operation of the supply 100 is comparable to someone (a bucket operator 110) filling a bucket (transformer T1) with water (electrical current) and then flushing the water into a pressurized water tank (capacitor C1) through a check-valve (D1). The water (current) flows down (as current $I_1$) into the bucket (T1) from a source ($V_{IN}$), and is flushed out (as current $I_2$) under (higher or lower) pressure $V_2$. In this analogy, the bucket operator (110) first presents the bucket (transformer T1) to the source (ON-time) until its inner level (magnetically coupled current $I_1/I_2$) reaches a defined limit. Then, the bucket operator (110) removes the bucket (T1) from the spring (OFF-time) and flushes the water (as current I2) into a tank (C1) that supplies a fire hose nozzle (at $V_{OUT}$). The bucket (T1) can be totally empty (i.e., zero magnetically coupled current I1/I2) before refilling (DCM), or some water (e.g., current $I_2$) can remain in the bucket (T1) before the user presents the bucket (T1) back to the spring (CCM). Suppose that the bucket operator (110) is skillful such that at each cycle he presents the bucket (T1) to the source ($V_{IN}$) at the precise instant that the water in the bucket (T1) from the previous cycle is completely flushed (thus operating in critical conduction mode).

The end user is a firefighter (such as a brave fireman of the New York City Fire Department, NYFD) who provides the feedback to the bucket operator (110) via his voice, shouting for more or less flow into the pressure tank (C1). If the flames increases, the firefighter applies water faster (higher load) and requires more pressurized water from the tank (C1) and thus asks the bucket operator (110) to provide the bucket (transformer T1), and therefore the tank (C1), with a higher flow. In other words, the bucket operator (110) will fills his container (T1) longer (ON-time increases).

If the flames decreases, the firefighter requires less pressurized water from the water tank (C1) and thus asks the bucket operator (110) to conserve water (conserve energy) by reducing the flow to the bucket (transformer T1), and thereby reducing the flow into the tank (C1). By reducing the filling time (ON-time) during which the flow (current $I_1$) from the source $V_{IN}$ is filling the bucket (T1), the flushing time (OFF-time) required to flush the water (as current $I_2$) into the tank (C1) is reduced. Thus, while the critical conduction mode is maintained, the cycle period (ON-time plus OFF-time) is reduced, thereby increasing the switching frequency $F_{SW}$. (Note: Increased switching frequency $F_{SW}$ is associated with increased switching losses, that is, the higher the switching frequency $F_{SW}$, the more energy is wasted, e.g., as heat in the power switch SW1.) The bucket operator (110) of the related art is very strict about limiting the maximum switching frequency, and he (110) clamps the switching frequency $F_{SW}$ to a predetermined maximum value $F_{SWCLAMPED}$, and the filling/flushing process leaves the critical conduction (flyback-SOP) mode of operation and remains in DCM at that predetermined fixed frequency $F_{SWCLAMPED}$. There is a generally practical limit on how quickly the bucket operator (110) can cut (turn-OFF) the flow of current ($I_1$) into the bucket (T1) from the source $V_{IN}$, and thus there is a minimum time ($t_{ONMIN}$ is the shortest practical ON-time) that filling the bucket (T1) can be performed.

In the frequency clamped SOP 100 of the related art, the predetermined maximum frequency $F_{SWCLAMPED}$ of the switching frequency ($F_{SW}$), is predetermined by the minimum ON-time ($t_{ONMIN}$) and by a fixed predetermined minimum OFF-time ($t_{OFFCLAMPED}$, e.g., where $t_{OFFCLAMPED}$ is fixed by an RC time-constant circuit including resistor $R_{FREQCLAMP}$ and capacitor $C_{FREQCLAMP}$, as shown in FIG. 1A). In the Frequency Clamped SOP 100 of the related art, the OFF-time is clamped to a predetermined minimum value which remains fixed by a time-constant circuit (e.g., $R_{FREQCLAMP}$ & $C_{FREQCLAMP}$ of FIG. 1A) even while the load approaches zero or becomes zero (i.e., the load is deemed zero when zero current is output from the power supply 100). The switching frequency $F_{SW}$ is clamped to a predetermined fixed frequency $F_{SWCLAMPED}$ in this manner in order to prevent the switching frequency $F_{SW}$ from shifting to a high value, which otherwise can happen in the absence of a load (i.e., zero load). When operating below this predetermined fixed frequency $F_{SWCLAMPED}$, the SOP 100 operates in critical conduction mode, with a varying frequency but generally constant duty-cycle. The power (P) consumed by the SOP 100 operating in critical conduction mode is governed by the equation:

$$P=0.5*F_{SW}*(t_{ON}{}^{\wedge}2)*V_{IN}{}^2/L,$$

where $t_{ON}$ is the ON-time; and L is the primary inductance of the transformer. When operating at the predetermined fixed frequency $F_{SWCLAMPED}$, the SOP 100 operates in a discontinuous conduction mode (DCM) with a generally constant duty-cycle. The power (P) consumed by the SOP 100 operating in discontinuous conduction mode (DCM) at the predetermined fixed frequency $F_{SWCLAMPED}$ is governed by the following equation:

$$P=0.5*F_{SWCLAMPED}*(t_{ONMIN}{}^{\wedge}2)*V_{IN}{}^2/L,$$

where $F_{SWCLAMPED}=1/(t_{ON}+t_{OFF})$, and $t_{ON}=t_{ONMIN}$, and $t_{OFF}$ is the fixed OFF-time $t_{OFFCLAMPED}$.

FIG. 1C is a block diagram depicting the internal functions of the Frequency Clamped Flyback Driver 110 of FIG. 1A. The functions of the Frequency Clamped Flyback Driver 110 of FIG. 1C may be performed by a Motorola Corp. switch driver chip known as an MC33368 controller. A switch driver 110 for controlling the ON/OFF state of the power switch SW1 (of FIG. 1A) may include a flip-flop (e.g., set-dominant latch) 118 and a combinatorial logic gate (e.g., NOR-gate 112) connected as shown in FIG. 1A. The combinatorial logic gate (112) combines control signals (e.g., latched zero-current detection signals from the latch 118, and minimum OFF-time signals from the frequency clamp 116) to effectively control the power switch (SW1 of FIG. 1A). Effective control of the power switch SW1 (for critical conduction mode operation) includes closing the switch SW1 immediately upon the occurrence of a zero-current condition of the output-current inductor coil (L2 of the SOP of FIG. 1A), which can be effected by outputting a control signal from the Zero Current Detector (130) to the combinatorial logic gate (112) and resetting the flip-flop 118. The flip-flop (118) latches the (switch-ON) control signal from the Zero-Current Detector (130) so that the switch will stay closed (ON) until the current ($I_1$) through the input-current inductor coil (L1) reaches a threshold current magnitude $I_{TH}$ or until an Output Overvoltage or other undesired condition is detected. Accordingly, the power switch (SW1 of FIG. 1A) will thereafter remain closed (ON) until: the current ($I_1$) through the input-current inductor coil (L1) reaches a threshold current magnitude $I_{TH}$, the value of $I_{TH}$ being determined by the external Mult control signal into a Multiplier (134); or until an Output Overvoltage is detected by circuit 132 based on feedback signal FB (from the output $V_{OUT}$ of the SOP 100 of FIG. 1A). After the power switch (SW1) opens (i.e., turns OFF), it will be closed again immediately upon the occurrence of a zero-current condition of the output-current inductor coil (L2 of the SOP of FIG. 1A), if and only if the OFF-time associated with switching frequency $F_{SW}$ that would occur during critical conduction mode operation is equal to or greater than the OFF-time associated with a predetermined fixed frequency $F_{SWCLAMPED}$. Regardless of the magnitude of the load (e.g., no matter how small the magnitude of the current out of the power supply), if the switching frequency $F_{SW}$ that would otherwise occur during critical conduction mode operation is greater than the predetermined fixed frequency $F_{SWCLAMPED}$, then the switching frequency $F_{SW}$ will be clamped to the predetermined fixed frequency $F_{SWCLAMPED}$. The Frequency Clamp 116, when controlled (via the Frequency Clamp Pin) by a time-constant circuit (e.g., $R_{FREQCLAMP}$ & $C_{FRQCLAMP}$ of FIG. 1A), will clamp the switching frequency $F_{SW}$ to the predetermined fixed frequency $F_{SWCLAMPED}$ by delaying the termination of the OFF-time (i.e., termination of the OFF-time is commencement of the ON-time) that otherwise would be effected by a zero-current-indicating signal from the Zero-Current Detector (130). An optional amplifying buffer 114 provides amplification of the current and/or voltage necessary to rapidly gate (i.e., turn ON/OFF) the power switch (SW1 of FIG. 1A).

FIG. 1D is a graph depicting the general relationship of switching frequency ($F_{SW}$) to a (slowly changing) load (e.g., a current $I_{SUP}$ out of the power supply indicated generally by $V_{OUT}/R_{LOADEQ}$) during medium-load and small-load conditions of the SOP 100 of FIG. 1A. The graph (FIG. 1D) is not drawn to scale, and the scaling factor "x" in each abscissa point along the logarithmic $R_{LOADEQ}$ axis depends upon the designed power-rating of a particular power supply made in accordance with the topology of SOP (100) of the related art. As illustrated in FIG. 1D, the SOP 100 of FIG. 1A will operate in critical conduction mode, with switching frequency ($F_{SW}$) increasing as the load decreases, until the switching frequency ($F_{SW}$) in critical conduction mode would exceed the predetermined fixed frequency $F_{SWCLAMPED}$ (due to small-load conditions), and $F_{SW}$ is thereafter clamped to the predetermined fixed frequency $F_{SWCLAMPED}$. The operation of the SOP (100 of FIG. 1A) under small load conditions, including zero-load conditions, incurs avoidable switching losses and consumes unnecessary electrical power.

SUMMARY OF THE INVENTION

The present invention overcomes the disadvantages of the self-oscillating switching power supply (SOP) 100 of the related art.

In a first aspect, the present invention provides a switching power supply having an output voltage ($V_{OUT}$) for supplying a supply current to a dynamically variable load, the switching power supply comprising:

an input-current inductor coil connected in series with an input voltage source ($V_{IN}$) and a power switch;

an output-current inductor coil for outputting an output current at at least the output voltage ($V_{OUT}$);

a zero-current detector having a detector-output being activated when the output current falls to zero;

a switch-driver circuit for closing and opening the power switch, the switch-driver circuit including:

a flip-flop adapted to latch the activated detector-output and having a first flip-flop input connected to the detector-output, and having a flip-flop output, the flip-flop output being activated while the activated detector-output is latched;

a combinatorial logic gate, having a first logic gate input connected to the flip-flop output and a second logic gate input and a logic gate output, the logic gate output being activated if the flip-flop output is activated and if the second logic gate input is not inhibited, the power switch being closed while the logic gate output is activated;

a pulse generator having a pulse generator-output for outputting an OFF-pulse having a dynamically variable load-modulated pulse width that corresponds to the dynamically variable load, the pulse generator-output being connected to the second logic gate input and inhibiting the second logic gate input during the pulse-width of the load-modulated OFF-pulse.

In a second aspect, the present invention provides a method for operating a switching power supply adapted to supply a load current through a dynamically variable load, the method comprising:

operating the supply in discontinuous current mode (DCM) while the supply is supplying load current having a first load current magnitude, and increasing the extent ($E_{DCM}$) that the supply operates in DCM as the load current decreases from the first load current magnitude; and operating the supply in critical current mode while the supply is supplying load current having a second load current magnitude that is larger than the first load current magnitude.

In a third aspect, the present invention provides a switching power supply adapted to operate in a critical conduction mode and in a discontinuous conduction mode, comprising:

a power switch connected in series to an input-current inductor coil and operatively coupled to an output-current inductor coil, the power switch adapted to interrupt an input current through the input-current inductor coil, the power switch being either in an OFF or an ON state and conducting the input current when in its ON state;

a switching controller adapted to control the state of the power switch, the switching controller being operatively coupled to:

a first feedback signal for indicating a zero-current condition in the output-current inductor coil, wherein the switching controller turns the power switch ON in response to the first feedback signal while the supply operates in the critical conduction mode;

a second feedback signal indicating a threshold current magnitude in the input-current inductor coil, wherein the switching controller turns the power switch OFF in response to the second feedback signal; and a third feedback signal, wherein the switching controller holds the power switch OFF notwithstanding the first feedback signal during a dynamically variable OFF-time that is varied in response to the third feedback signal while the supply operates in the discontinuous conduction mode.

The foregoing and other features and advantages of the present invention will be apparent from the following description of embodiments of the present invention.

BRIEF DESCRIPTION OF THE DRAWINGS

The features and inventive aspects of the present invention will become more apparent upon reading the following detailed description, claims, and drawings, of which the following is a brief description.

It should be noted that the same element numbers are assigned to components having or which may have the same, or approximately the same functions and structural features. Thus, elements in different figures and labeled with the same element number may be identical, or substantially similar in composition, structure and/or function, and where the function of such element has been explained, there is no necessity for repeated explanation thereof in the detailed description.

DETAILED DESCRIPTION OF THE INVENTION

Figure 1A:
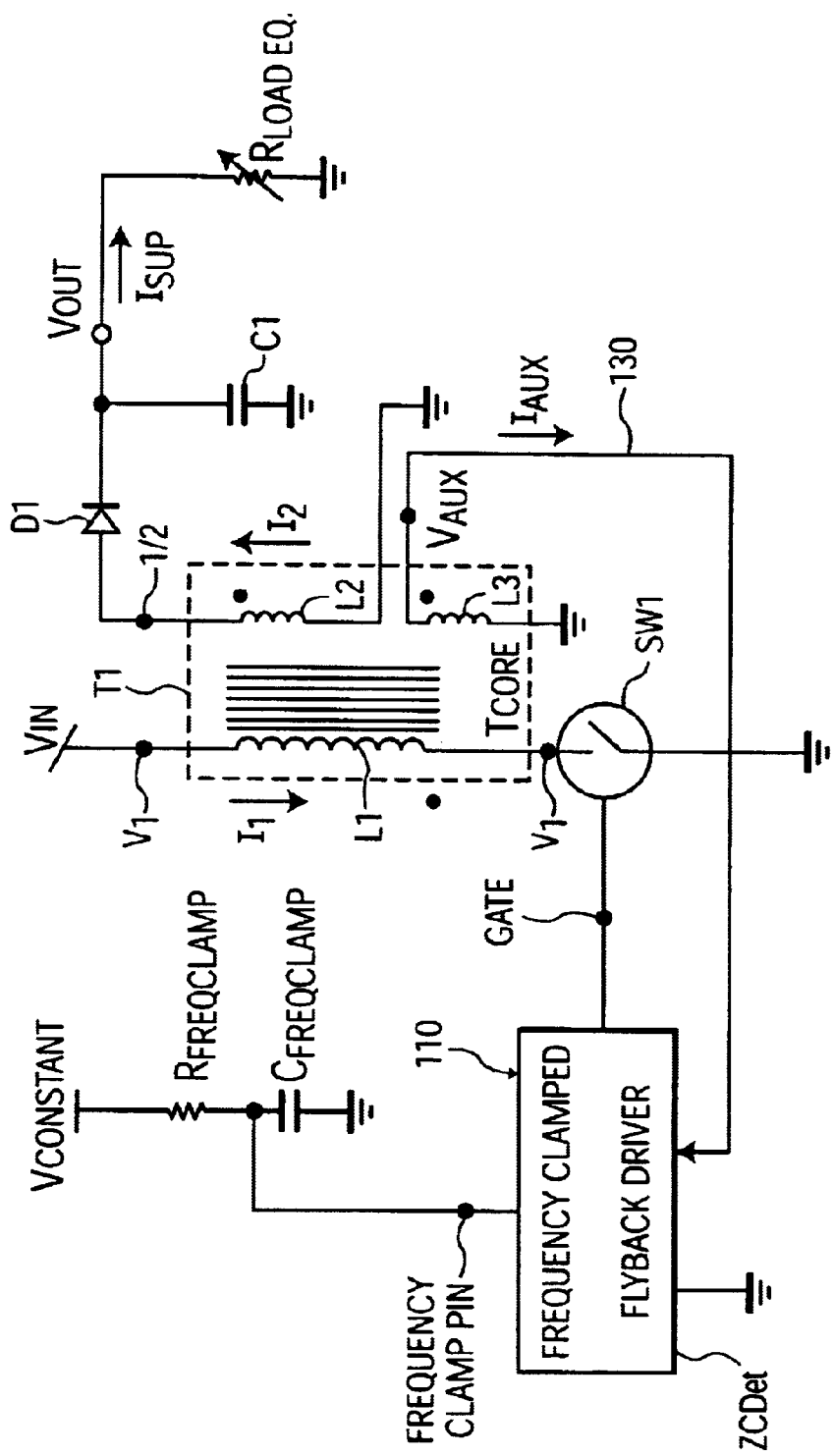
FIG. 1A is a circuit diagram depicting a typical topology of a self-oscillating (i.e., flyback) switching power supply (SOP) of the related art.
Figure 2A:
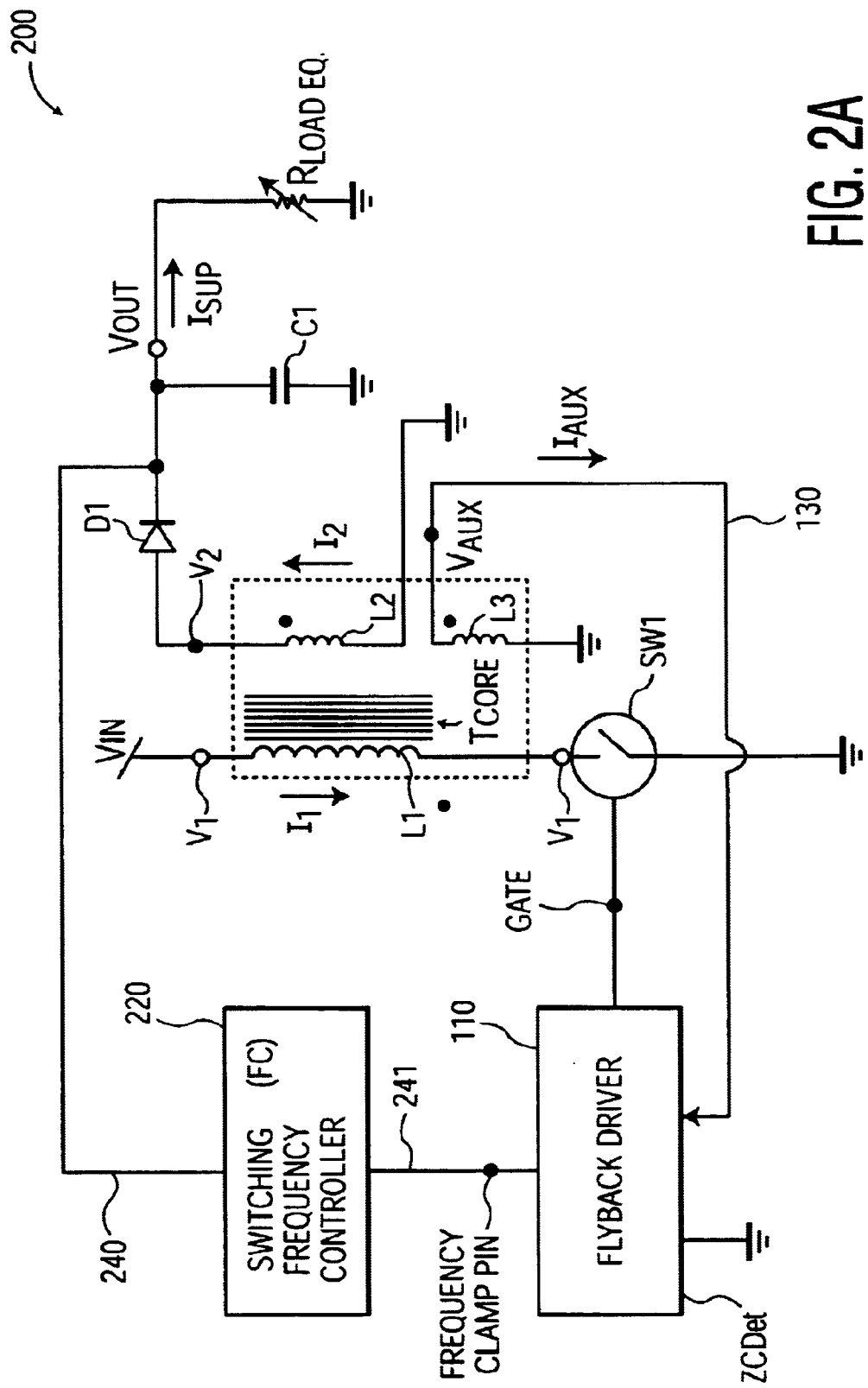
FIG. 2A is a block diagram depicting a first general topology of a frequency modulated self-oscillating switching power supply (FMSOP) in accordance with embodiments of the present invention.

FIG. 2A is a block diagram depicting a first general topology of a frequency modulated self-oscillating switching power supply (FMSOP) 200 in accordance with embodiments of the present invention. The FMSOP 200 embodiment of FIG. 2A is an improvement of the related art SOP 100 of FIG. 1A, and has many elements in common, as indicated by the common element numbers. The FMSOP 200 includes a switching-frequency controller (FC) 220, instead of a time-constant circuit (e.g., $R_{FREQCLAMP}$ & $C_{FREQCLAMP}$ of FIG. 1A), coupled by a line (241) to the switch driver (e.g. 110 of FIG. 1A). The frequency controller (FC) 220 provides a load-modulated time reference $t_{OFFMIN}$ (during small loads, $t_{OFF}=t_{OFFMIN}$) to the switch driver 210, instead of the time-constant ($t_{OFFCLAMPED}$) of FIG. 1A. (Switch driver 210 can be implemented with the same Motorola MC33364 chip as used to implement driver 110 of FIG. 1A, if, for example, used in conjunction with a load-modulated-current-injecting frequency-controller (FC) 220 circuit such as the circuit depicted in FIG. 2B).

The load-modulated time reference ($t_{OFFMIN}$) will constitute the OFF-time ($t_{OFF}$) of the power switch (SW1) during small-load conditions ($t_{OFFSL}$) when the FMSOP 200 operates in discontinuous conduction mode (DCM). Thus, the switching frequency ($F_{SW}$) during small-load conditions will vary as a function of the load, instead of remaining constant (e.g., clamped to the predetermined fixed frequency $F_{SWCLAMPED}$). Thus, during small-load conditions, the switching frequency $F_{SW}$ of the FMSOP 200 is a load-modulated switching frequency ($F_{LMSW}$) calculated as the inverse of the sum of the minimum ON-time ($t_{ON}=t_{ONMIN}$) plus the load-modulated OFF-time ($t_{OFF}=t_{OFFMIN}$)(i.e., $F_{LMSW}=1/(t_{ONMIM}+t_{OFFMIN})$.

During small-load conditions, the frequency controller (FC) 220 modulates the small-load OFF-time ($t_{OFFSL}$) so that $t_{OFFSL}$ ($t_{OFF}=t_{OFFSL}=t_{OFFMIN}$) will increase as the small load further decreases. Thus, as the small load decreases, the load-modulated switching frequency $F_{LMSW}$ decreases (e.g., approximately linearly with decreasing load current, i.e., current through the load having resistance $R_{LOADEQ}$), thus reducing power (P) consumption, preventing "output overvoltage," and further reducing switching losses. The more that $t_{OFFMIN}$ exceeds $t_{AUX}$ of a cycle, the more "dead time" will be in that cycle, and the more strongly the supply 200 operates in DCM. The "dead time" (i.e., the time difference that $t_{OFFSL}$ exceeds $t_{AUX}$ under small load conditions) is the time ($t_{OFFDELAY}$) during which the OFF-time is extended and the next ON-time is delayed, measured between the moment which the output current in the output-current inductor coil falls to zero and the commencement of the next ON-time. Thus, "dead time"=$t_{OFFDELAY}$=($t_{OFFSL}-t_{AUX}$). Thus, the variable extent ($E_{DCM}$) to which an FMSOP (e.g., 200 of FIG. 2A, or 300 of FIG. 3, or 400 of FIG. 4A) operates in DCM can be objectively calculated and expressed as the ratio of $t_{OFFDELAY}$ to either $t_{ONMIN}$, $t_{OFFMIN}$, $t_{AUX}$, or ($t_{ONMIN}+t_{OFFMIN}$) or ($t_{ONMIN}+t_{AUX}$). The extent ($E_{DCM}$), by whichever ratio it is defined, will generally increase monotonicly under small-load conditions as the small load is monotonicly decreased further.

As the load approaches zero, (e.g., $R_{LOADEQ}$ approaches infinity), the load-modulated OFF-time ($t_{OFFSL}$) will approach a maximum value $t_{OFFMAX}$, which may be predetermined. Thus, as the load approaches zero, (i.e., $R_{LOADEQ}$ approaches infinity), the switching frequency $F_{SW}$ ($F_{SW}=F_{LMSW}$) will approach a minimum value $F_{SWMIN}$ which may be predetermined. The minimum frequency $F_{SWMIN}$ may be selected to be effective to maintain the appropriate output voltage$_{OUT}$ while consuming minimal electrical power (P) supplied from $V_{IN}$. Thus, when there is no load on the frequency-modulated self-oscillating switching power supply (FMSOP) 200, the supply 200 can maintain an appropriate output voltage$_{OUT}$ while consuming only minimal electrical power (P).

When the supply (FMSOP) 200 is operating in critical conduction mode, (e.g., at medium and high load conditions), the power (P) consumed by the FMSOP 200 is governed by the equation:

$$P=0.5*F_{SW}*(t_{ON}\char`\^2)*V_{IN}^2/L;$$

and $F_{SW}$ is governed by the flyback feedback signal (via line 130) at the Zero-Current Detector of switch driver 210, and $t_{OFF}=t_{ON}*(N_T*_{OUT}/V_{IN})$. When operating at the load-modulated switching frequency $F_{LMSW}$, the FMSOP 200 operates in a discontinuous conduction mode (DCM) with a switching frequency and duty-cycle that generally decreases as the load decreases to zero. The power (P) consumed by the FMSOP 200 operating in discontinuous conduction mode at the load-modulated switching frequency $F_{LMSW}$ is governed by the equation:

$$P=0.5*F_{LMSW}*(t_{ONMIN}\char`\^2)*V_{IN}^2/L,$$

where $F_{LMSW}=1/(t_{ON}+t_{OFF})$, while $t_{ON}=t_{ONMIN}$, and $t_{OFF}$ is the load-modulated minimum OFF-time $t_{OFFMIN}$. Accordingly, as the load approaches zero, the power consumption (P) will decrease and approach a minimum.

Figure 4A:
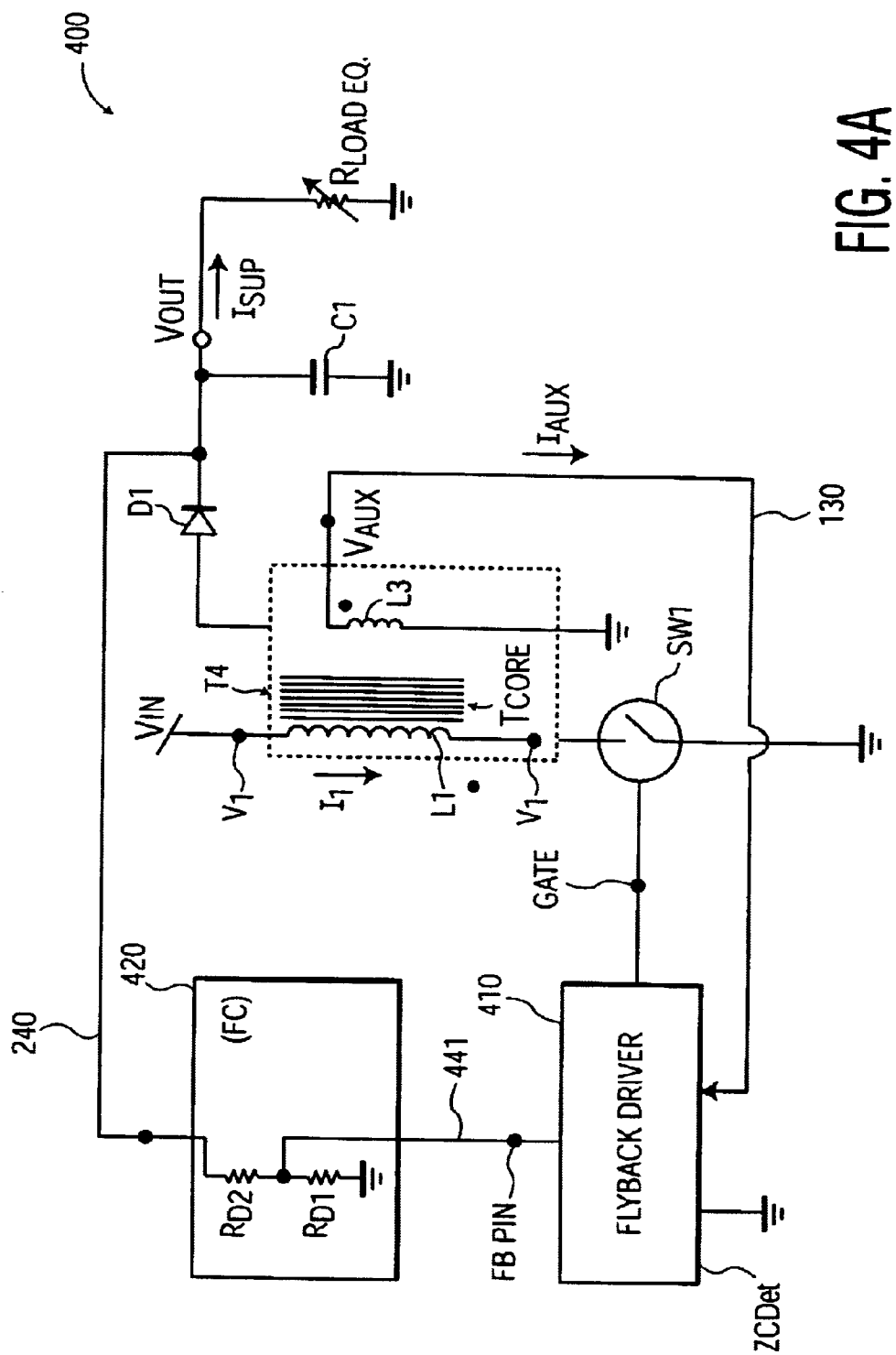
FIG. 4A is a block diagram depicting an FMSOP regulating small-load switching frequency with a voltage-controlled pulse generator (VCPG) included within the switch-driver 410 circuit, in accordance with embodiments of the present invention.
Figure 4B:
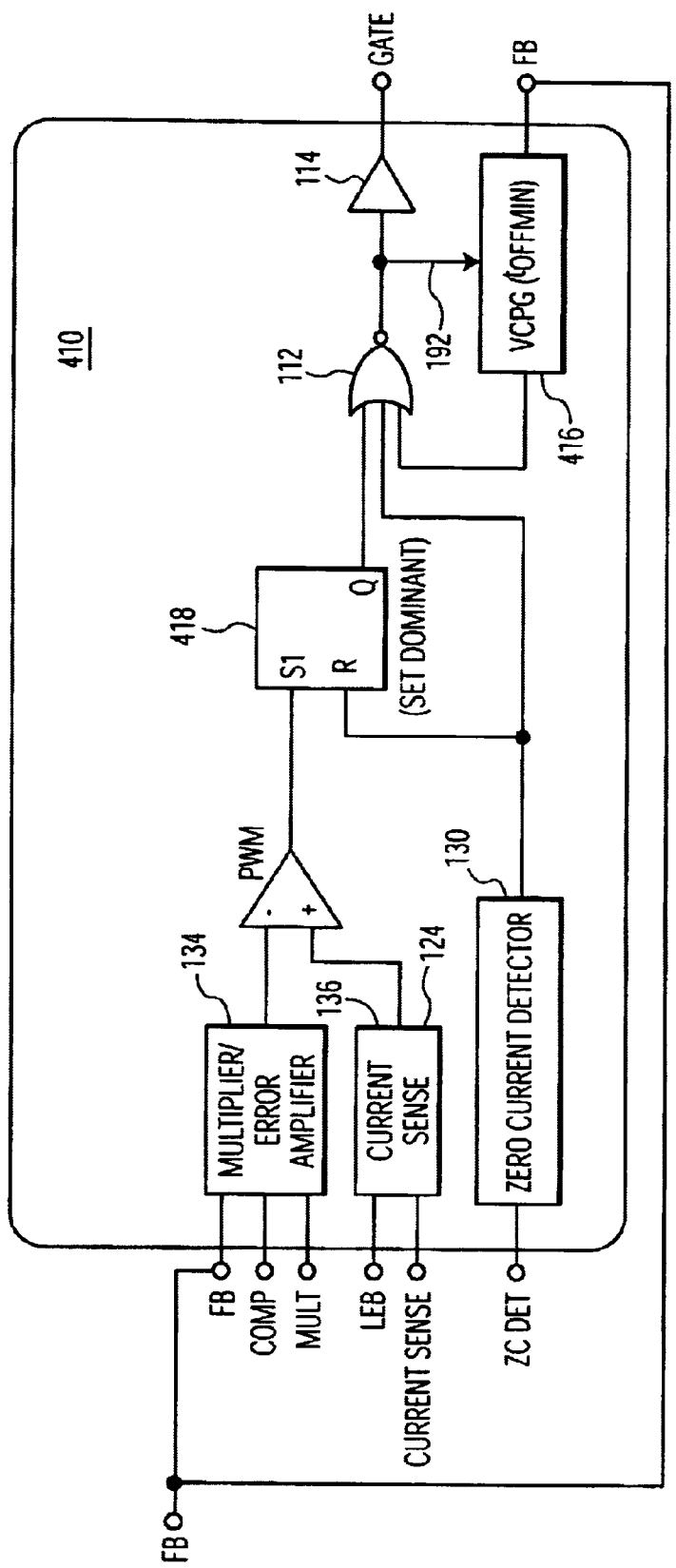
FIG. 4B is a block diagram depicting internal functions of the switch-driver for the FMSOP of FIG. 4A.

The load-modulated time reference ($t_{OFFMIN}$) is produced in the load-modulated frequency controller (FC) 220 or, in alternative embodiments, by circuitry integrated within the switch driver 210 (see, e.g., FIGS. 4A & 4B). The time reference ($t_{OFFMIN}$) can be produced by analog circuits or by digital circuits.

Figure 2B:
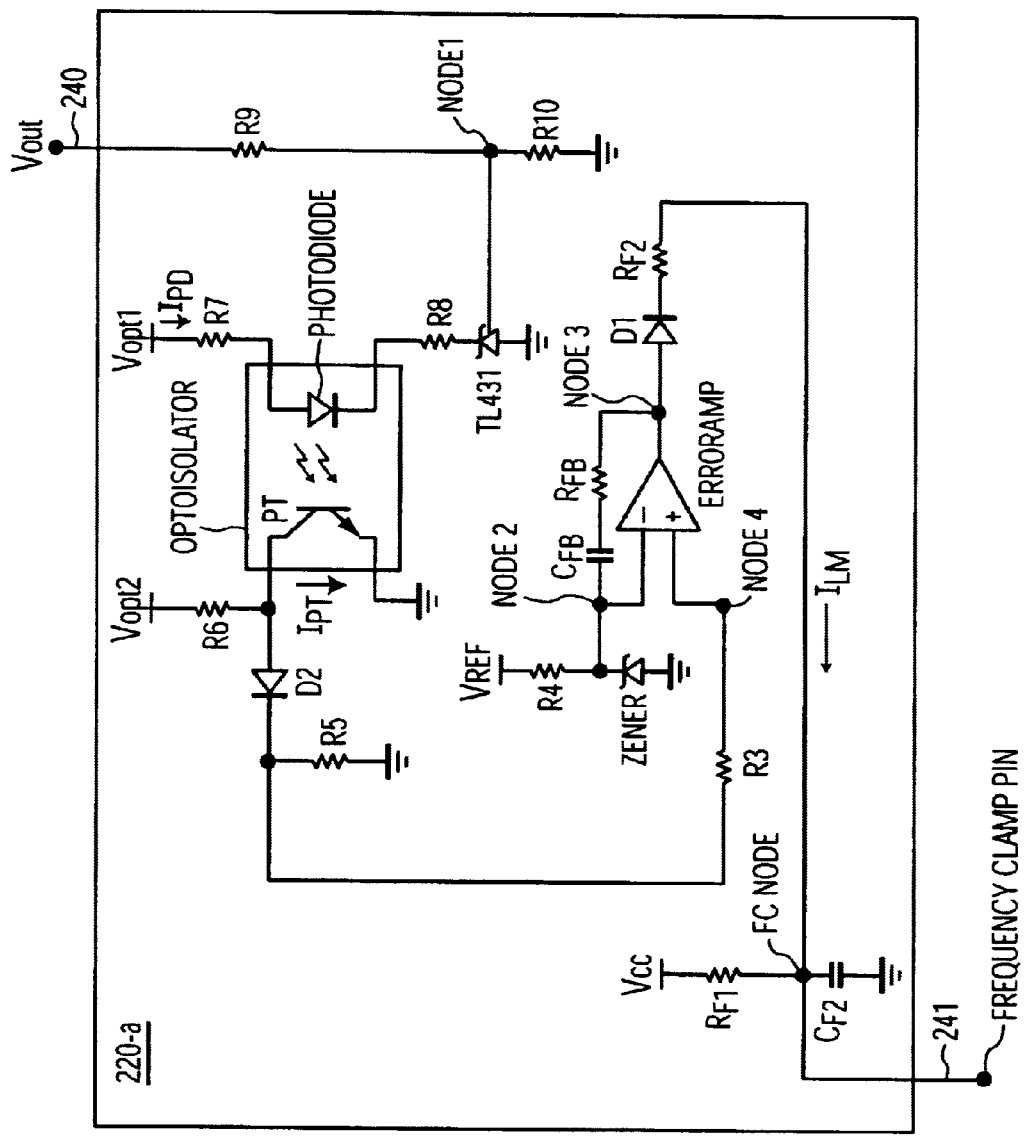
FIG. 2B is a circuit diagram depicting a switching frequency modulator circuit with optical isolation adapted to modulate the switching frequency of the FMSOP of FIG. 2A.

FIG. 2B is a circuit diagram depicting a load-modulated frequency controller (FC) 220-a, with optical isolation, adapted to load-modulate the switching frequency of the FMSOP 200 of FIG. 2A during small-load conditions. The frequency controller (FC) 220-a of FIG. 2B can be employed as the frequency controller (FC) 220 of FIG. 2A when the switch driver 210 (of FIG. 2A) is implemented by the Motorola Corp. controller chip known as an MC33368 or by other flyback driver circuits having similar frequency-clamping functions.

The frequency controller (FC) 220-a employs analog circuits to generate a load-modulated OFF-time reference signal encoding the time reference $t_{OFFMIN}$ (during small loads, $t_{OFF}=t_{OFFSL}=t_{OFFMIN}$) supplied to the switch driver 210 in FIG. 2A, instead of supplying a time-constant ($t_{OFFCLAMPED}$) as used in the related art SOP 100 FIG. 1A. The FC 220-a receives a feedback signal (e.g., voltage $_{OUT}$) via a line (240) from a load-sensing circuit (e.g., the entire voltage $_{OUT}$ across the load (e.g., $R_{LOADEQ}$) itself, or a voltage-divided portion thereof). A small-load condition (including zero-load) is characterized by a high value of $_{OUT}$ as compared to the magnitude of voltage $_{OUT}$ during medium load or highest rated load. The small-load condition can be defined as beginning at the point when switching losses that would be incurred during critical current mode operation of an SOP (e.g., 100 of FIG. 1A) at that load are unacceptably high, and as ending at zero-load. The elements of the FC 220-a circuit translate variations in the small-load into a load-modulated current $I_{LM}$ that is used to contribute to the filling of the capacitor $C_{F1}$. The filling of the capacitor $C_{F1}$ establishes an enabling voltage at node FCNODE which when sensed at the Frequency Clamp Pin can release an inhibition by the Frequency Clamp of the commencement of the ON-time.

The drive output (GATE) of switch driver 210 (e.g., the Motorola MC33368 chip) is inhibited (i.e. commencement of the ON-time is inhibited) when the voltage at its frequency clamp pin (being equipotential with FCNODE) is less than 2.0 volts. When the driver output (GATE) is High (during ON-time), $C_{F1}$ is discharged through an internal 100 uA current source. When the drive output goes Low (i.e., OFF-time commences), $C_{F1}$ is charged through $R_{F1}$ and by current $I_{LM}$. Activation of the switch driver (210) output (GATE) (i.e., commencement of the ON-time) is inhibited until the voltage across $C_{F1}$ (at node FCNODE) reaches 2.0 volts, establishing a minimum OFF-time ($t_{OFFMIN}$) which is modulated by the current $I_{LM}$ which fills the capacitor $C_{F1}$. The larger the current $I_{LM}$ is, the faster the capacitor $C_{F1}$ will rise above 2.0 volts, and the shorter the minimum OFF-time ($t_{OFFMIN}$) will be. Thus, during medium load and high load conditions, the current $I_{LM}$ is at a high value, (so that the FMSOP 200 can operate in critical conduction mode), and during zero-load conditions the current $I_{LM}$ will be at a relatively low or zero-current, with varying load-modulated magnitudes in between (so that the FMSOP 200 can operate in a load-modulated discontinuous conduction mode) during small load conditions. The minimum OFF-time ($t_{OFFMIN}$) controlled by a load-modulated signal (e.g., current $I_{LM}$) is the small-load OFF-time ($t_{OFFSL}$).

During normal operation of the FMSOP 200 (e.g., in critical conduction mode under medium load), the output voltage ($_{OUT}$) drops or sags (relative to its zero-load value) under increasing load. Thus, the output voltage $_{OUT}$ is generally a function of the load. The voltage at Node1 of the voltage divider ($R_9$ & $R_{10}$) falls proportionately with the drop of $_{OUT}$. The three-terminal adjustable shunt regulator TL431 controls the current through the PhotoDiode in the OptoIsolator (and through resistor $R_7$) as a function of the voltage at Node1. The light emitted by the PhotoDiode is a function of the load. The phototransistor (PT) is optically coupled to the PhotoDiode. A current ($I_{PD}$) that passes through the photo diode PhotoDiode causes photons to be emitted by PhotoDiode. The photons are coupled to the photo transistor (PT), which conducts a current ($I_{PT}$) through the photo transistor (PT). The phototransistor (PT) forms a part of a voltage-divider ($R_6$ & PT).

The voltage-divider ($R_6$ & PT) generates a load-modulated voltage signal that propagates through diode D2, past resistor $R_5$, and through resistor R3 into the non-inverting ("+") terminal of the error amplifier ErrorAmp. The error amplifier ErrorAmp has an inverting terminal ("−") connected to a constant voltage node (Node2) and a non-inverting terminal ("+") connected to the voltage-divider ($R_6$ & PT) through diode D2 and resistor $R_3$ and Node4. The inverting terminal ("−") of the error amplifier ErrorAmp is connected to a constant-voltage circuit (zener & resistor R4 dividing reference voltage $V_{REF}$), and to a series RC feedback (through $R_{FB}$ & $C_{FB}$) from its output at Node3. The output of ErrorAmp at Node 3 is the load-modulated current $I_{LM}$. Current $I_{LM}$ passes through diode D1 and resistor $R_{F2}$ into capacitor $C_{F1}$, as aforesaid. Thus, those skilled in the art will recognize that the circuit of FC 220-a including error amplifier ErrorAmp, the photo diode PhotoDiode, and the photo transistor PT form an optoisolated voltage-controlled current source.

Figure 1B:
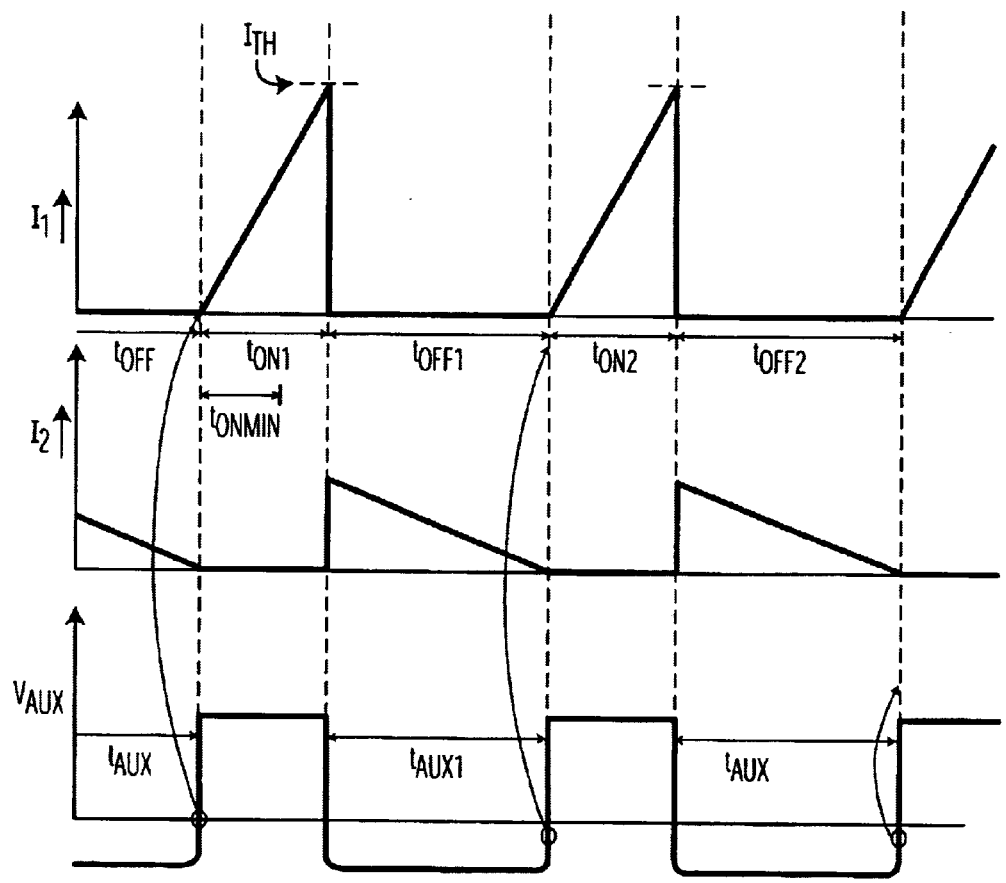
FIG. 1B is a timing diagram depicting currents and voltages in the SOP of FIG. 1A operating in critical conduction mode.
Figure 1C:
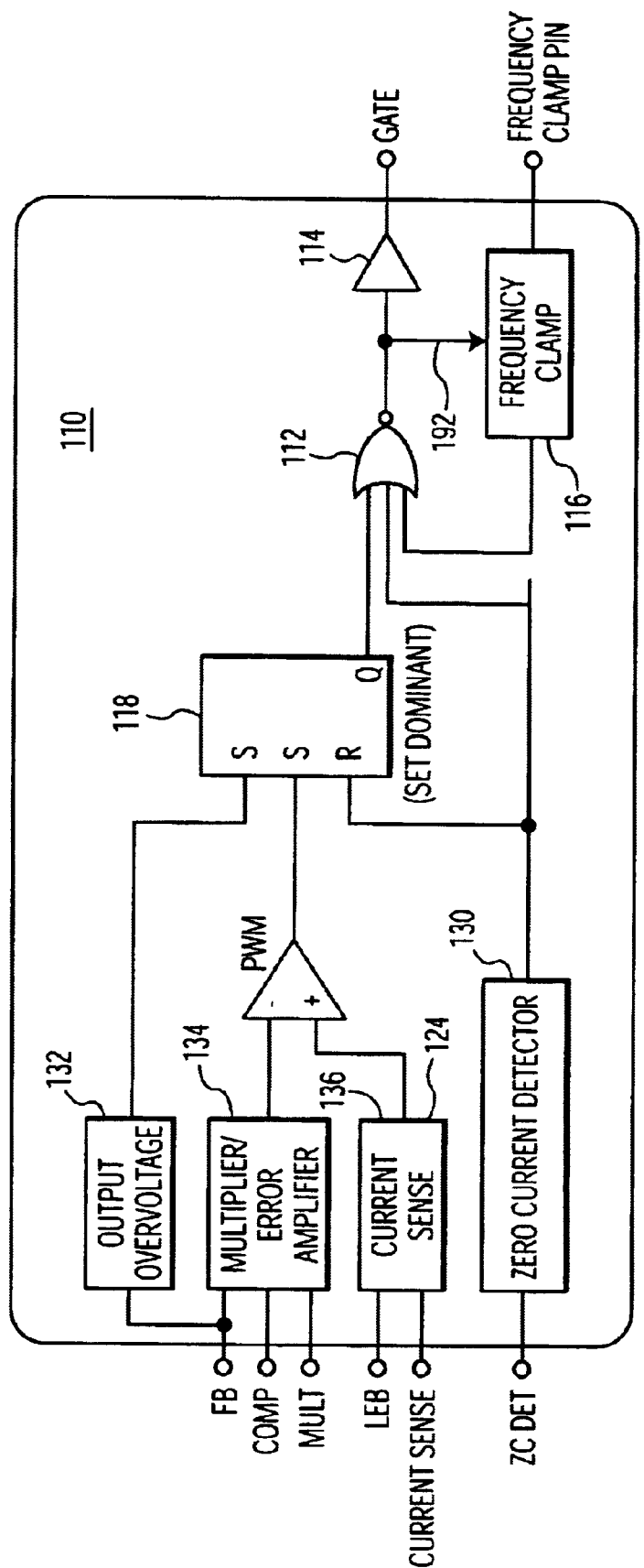
FIG. 1C is a block diagram depicting internal functions of the Flyback Driver of the self-oscillating switching power supply (SOP) of FIG. 1A.
Figure 1D:
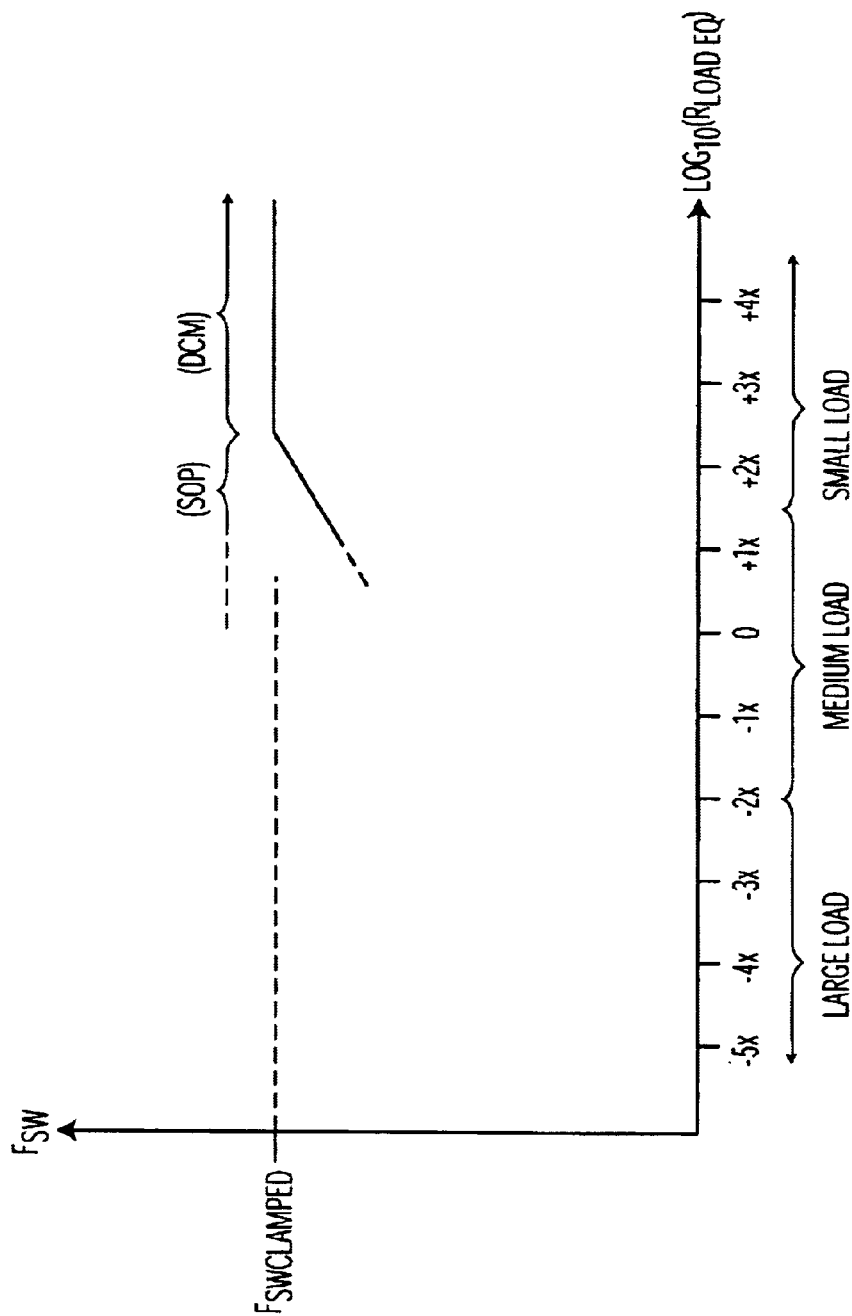
FIG. 1D is a graph depicting the general relationship of switching frequency ($F_{SW}$) to load during medium-load and small-load conditions of the SOP of FIG. 1A.

The load-modulated frequency controller (FC) 220 (see FIG. 2A) and circuits connected thereto within the Frequency Clamp circuit (116 of FIG. 1C) of the switch-driver (210) constitute an analog-to-digital converter (ADC) that outputs a load-modulated pulse ($P_{OFFMIN}$) into the combinatorial logic gate (112, see FIG. 1C), wherein the width of the pulse ($P_{OFFMIN}$) is equal to or approximately equal to a load-modulated time reference ($t_{OFFMIN}$) that corresponds to the magnitude of the load (e.g., corresponds inversely to resistance $R_{LOADEQ}$). The time reference ($t_{OFFMIN}$) can be supplied directly to an input to the combinatorial logic gate (e.g., 112 in FIG. 1B) in switch driver 210 (of FIG. 2A), as a binary pulse-width modulated signal ($P_{OFFMIN}$) that is width-modulated by the load upon the FMSOP (200). (In alternative embodiments of the FC 220-a, the output of the combinatorial logic gate (112) can be gated (i.e., interrupted or passed) by the pulse $P_{OFFMIN}$ (e.g., AND-ed or NAND-ed with the pulse $P_{OFFMIN}$) to inhibit the activation of the switch driver (210) output (GATE) (i.e., to inhibit the commencement of the next ON-time) during the period $t_{OFFMIN}$. If the output of the combinatorial logic gate (112) is gated by the the pulse $P_{OFFMIN}$ (instead of having pulse $P_{OFFMIN}$ as an input to combinatorial logic gate (112)), the resulting combinatorial circuit will constitute a combinatorial logic gate that is functionally equivalent in the material aspects to combinatorial logic gate (112) with each of its original inputs.

The pulse ($P_{OFFMIN}$) will begin (i.e., go active) when the binary output of the combinatorial logic gate (e.g., 112) turns the switch OFF, (via the power switch's GATE). Thus a feedback signal (192 in FIG. 1C, from the combinatorial logic gate (e.g., 112)) to the time-reference generating circuitry (e.g., frequency controller 220 & frequency clamp 116) may be provided for synchronization. The pulse ($P_{OFFMIN}$) will end when the time $t_{OFFMIN}$ has elapsed after the pulse ($P_{OFFMIN}$) began, the width of the pulse ($P_{OFFMIN}$) being equal or approximately equal to the load-modulated time reference ($t_{OFFMIN}$).

Certainly, various other analog circuits can be adapted by persons skilled in the art to load-modulate the minimum OFF-time ($t_{OFFMIN}$) of the switch, and therefore load-modulate the switching frequency ($F_{SW}$), during small-load conditions. For example, in alternative embodiments of the FC 220-a circuit, the voltage-controlled current source could be replaced (i.e., $I_{LM}=0$) with a circuit to modulate voltage $V_{CC}$ according to the output voltage $_{OUT}$ (e.g., increasing $V_{CC}$ when $_{OUT}$ increases, in order to dynamically reduce the time $t_{OFFMIN}$ needed to fill capacitor $C_{F1}$). While the FC 220-a of FIG. 2B is optoisolated from the output voltage ($_{OUT}$), in some embodiments of a FMSOP, isolation might be unnecessary (see, e.g., FIGS. 4A & 4B), or other isolation methodologies may be employed (such as magnetic isolation).

Figure 2C:
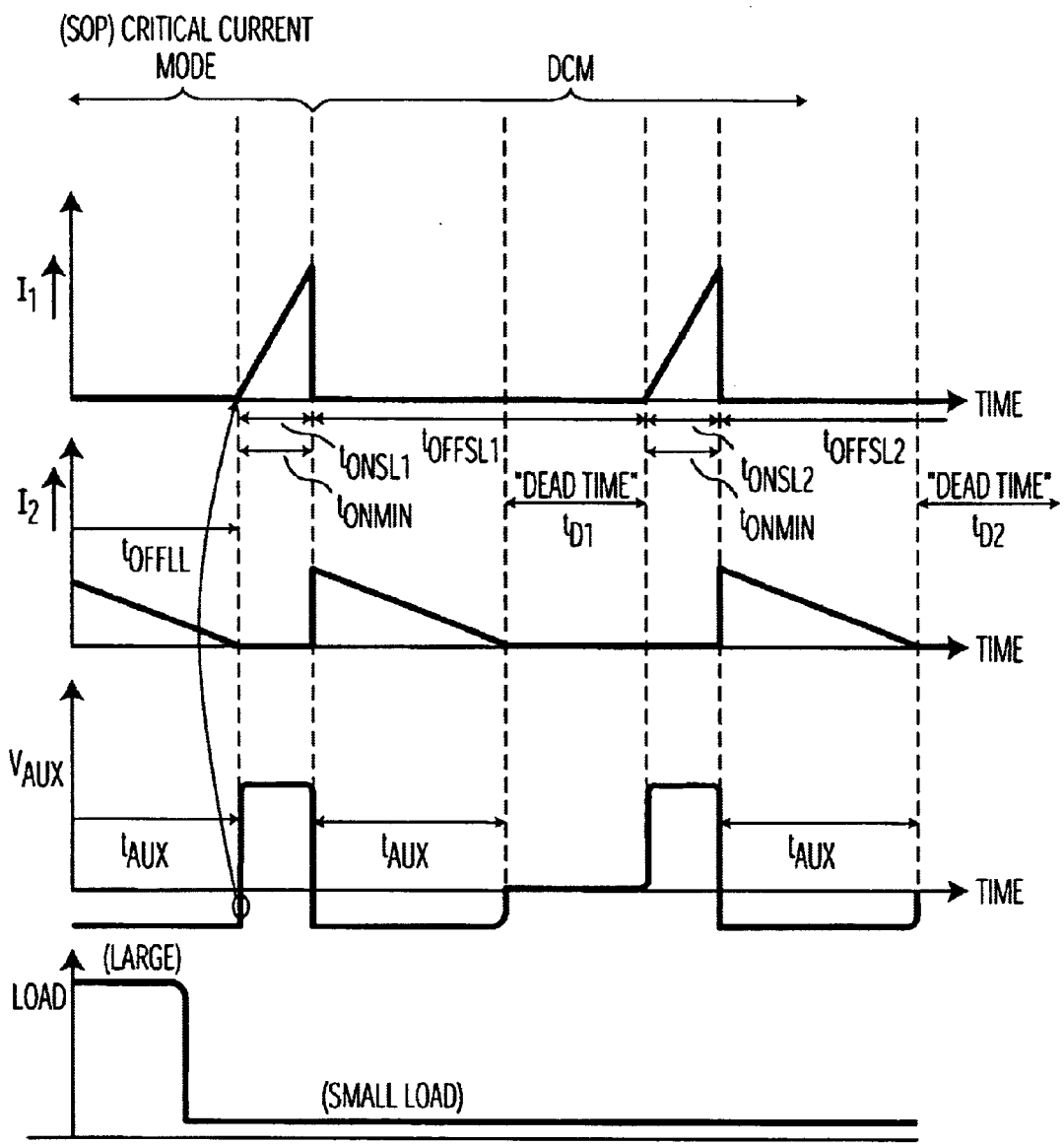
FIG. 2C is a timing diagram depicting currents and voltages in the FMSOP of FIG. 2A operating in critical conduction mode and in load-modulated discontinuous-conduction mode.

FIG. 2C is a timing diagram depicting currents and voltages in the FMSOP 200 of FIG. 2A operating in critical conduction mode (e.g., during large load) and in a load-modulated discontinuous-conduction mode (during small-load). A transition from large-load conditions (e.g., critical current mode, which is indicated by the absence of "dead-time" after OFF-time, $t_{OFFLL}$) to small-load conditions (i.e., with a substantial dead-time $t_{D1}$) generally will not be abrupt, (i.e., not as abrupt as depicted in FIG. 2C). FIG. 2C depicts large-load operating conditions (critical current mode) adjacent to small-load operating conditions (e.g., strongly discontinuous current mode) for purposes of side-by-side comparison. While in critical current mode (e.g., during medium load and some large load conditions), the FMSOP 200 will operate in the same SOP manner as the SOP manner of SOP 100 of FIG. 1A, and the switching frequency $F_{SW}$ will governed by the flyback feedback signal (e.g., $V_{AUX}$).

As the load decreases, the load-modulated minimum OFF-time ($t_{OFFMIN}$) will reach a point when the resulting OFF-time (e.g., $t_{OFFSL1}$) will be (slightly) longer than $t_{AUX}$. At and beyond this load-point each ON-time (e.g., $t_{ONSL1}$ & $t_{ONSL2}$) may be expected to be near, approaching or, fixed at or around its practical minimum $t_{ONMIN}$. When the load-modulated minimum OFF-time ($t_{OFFMIN}$) is greater than $t_{AUX}$ there will be a "DeadTime" period (e.g., $t_{D1}$) within the real OFF-time (e.g., $t_{OFFSL1}$) before the next ON-time (e.g., $t_{ONSL2}$). As the load decreases further (i.e., approaches zero-load), the load-modulated minimum OFF-time ($t_{OFFMIN}$) will increase, and consequently, the "DeadTime" within the OFF-time will increase, and the switching frequency $F_{SW}$ will decrease. As the load approaches zero, the switching frequency $F_{SW}$ (i.e., $F_{SW}=1/(t_{ONMIN}+t_{OFFMIN})$) will decrease until $F_{SW}$ reaches a minimum switching frequency $F_{SWMIN}$, which may be predetermined.

Figure 2D:
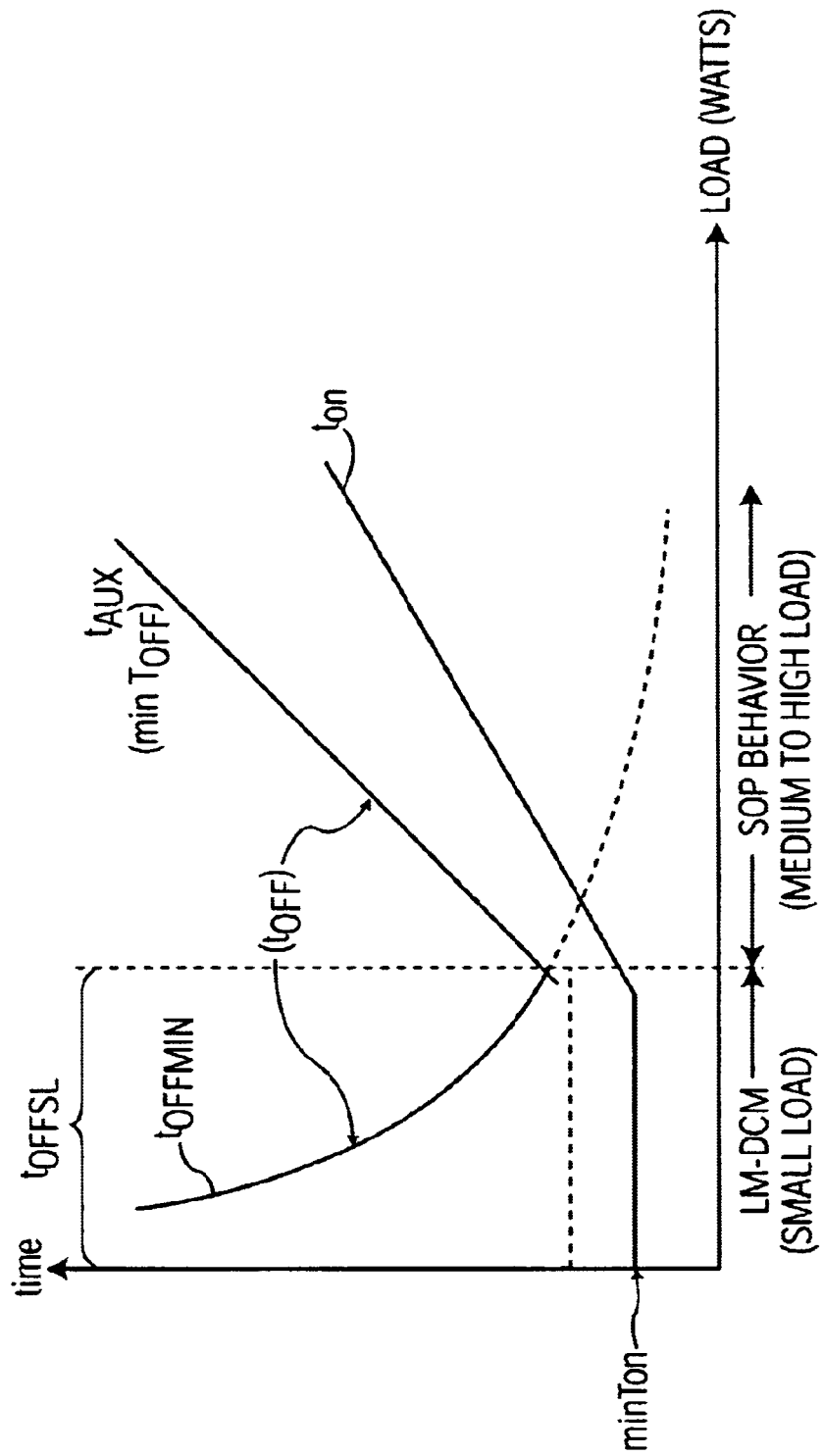
FIG. 2D is a graph depicting ON-time and OFF-time as functions of load on the output of the FMSOP of FIG. 2A.
Figure 3:
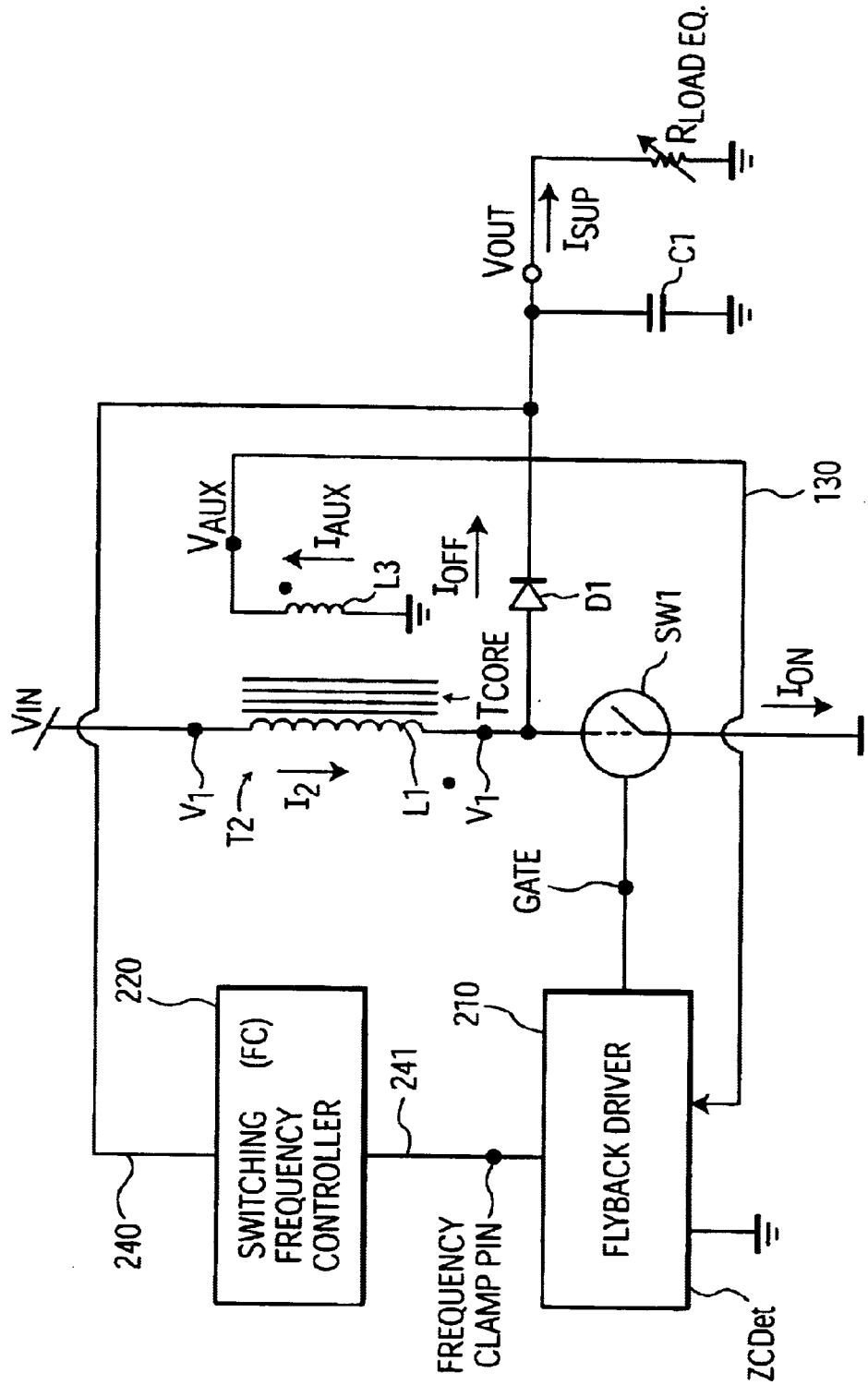
FIG. 3 is a block diagram depicting a second general topology of a frequency modulated self-oscillating switching power supply (FMSOP) in accordance with embodiments of the present invention.

FIG. 2D is a graph depicting ON-time ($t_{ON}$) and OFF-time ($t_{OFF}$) as functions of the load on the output of an FMSOP (e.g., 200 of FIG. 2A, 300 of FIG. 3, or 400 of FIG. 4A). As illustrated in FIG. 2D, the OFF-time ($t_{OFF}$) of the power switch (SW1 of FIG. 2A) during critical current mode operation (e.g., flyback operation under medium and large load conditions) is governed by and substantially equal to $t_{AUX}$ as previously defined (i.e., $t_{OFF}=t_{AUX}$). As further illustrated in FIG. 2D, the OFF-time ($t_{OFF}$) of the power switch (SW1 of FIG. 2A) during load-modulated DCM operation (LM-DCM) (e.g., under small load conditions) is governed by and is substantially equal to the load-modulated minimum OFF-time $t_{OFFMIN}$ as previously defined (i.e., $t_{OFFSL}=t_{OFFMIN}$). The transition point between critical current mode operation and DCM operation is the point when the load-modulated minimum OFF-time ($t_{OFFMIN}$) is equal to $t_{AUX}$. This transition point can be shifted up or down (along the load axis) by persons of ordinary skill in the art by changing the values of $t_{OFFMIN}$ as a function of the load, such as by changing the resistance ratio between the values of resistors R9 and R10 in the FC 220-$a$ of FIG. 2B, and by various other adjustments and modifications. Because the switching frequency $F_{SW}$ is a function of the ON-time and the OFF-time of each cycle (i.e., $F_{SW}=1/(t_{ON}+t_{OFF})$), the switching frequency $F_{SW}$ and power consumption (P) will generally decrease with decreasing load in LM-DCM operation under small-load conditions. The duty cycle ($Q_{FM}$) of the FMSOP 200 is calculated as the ratio of the ON-time to the sum of the ON-time plus the subsequent OFF-time (i.e., $Q_{FM}$="ON-time"/("ON-time" plus "OFF-time")). Thus, under small-load conditions, the duty cycle ($Q_{FM}$) of the FMSOP 200 will generally decrease as the load is decreased, even while the "ON-time" is fixed at its practical minimum value $t_{ONMIN}$.

Figure 2E:
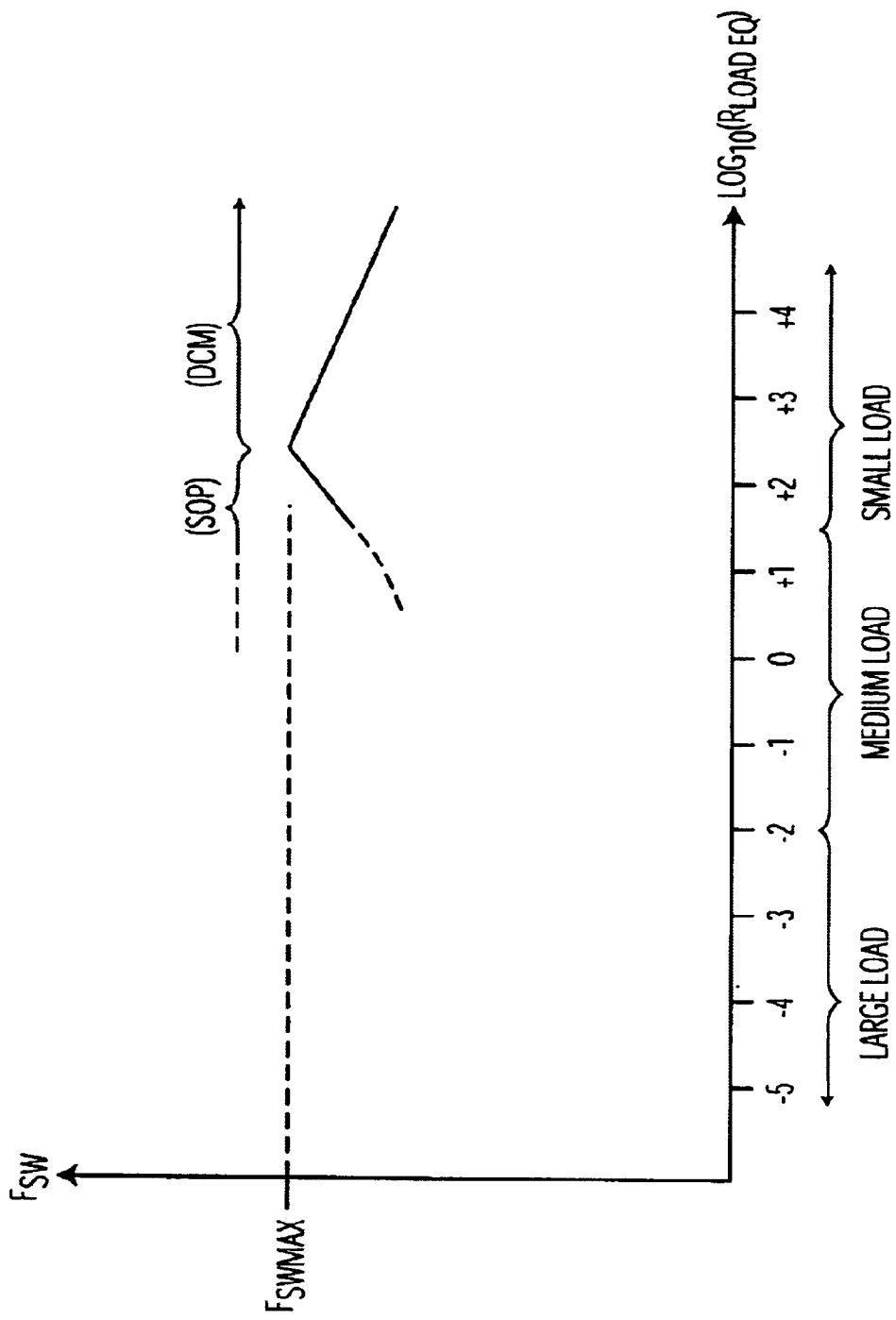
FIG. 2E is a graph depicting the general relationship of switching frequency ($F_{SW}$) to load during medium-load and small-load conditions of the FMSOP of FIG. 2A.

FIG. 2E is a graph depicting the general relationship of switching frequency ($F_{SW}$) to load (load being indicated by $R_{LOADEQ}$) under medium-load and small-load conditions of an FMSOP (e.g., 200 of FIG. 2A, 300 of FIG. 3, or 400 of FIG. 4A). The graph (FIG. 2E) is not drawn to scale, and the scaling factor "x" in each abscissa point along the logarithmic $R_{LOADEQ}$ axis depends upon the designed power-rating of a particular power supply made in accordance with the topology of a FMSOP (e.g., 200 of FIG. 2A, 300 of FIG. 3, or 400 of FIG. 4A). As illustrated in FIG. 2E in conjunction with FIG. 2D, the FMSOP will operate in critical conduction mode, with switching frequency ($F_{SW}$) generally increasing as the load decreases until the point at which the OFF-time component of the switching frequency ($F_{SW}$) in critical conduction mode would exceed the load-modulated minimum OFF-time ($t_{OFFMIN}$), and $F_{SW}$ is decreased as the load is further decreased. The operation of the FMSOP (e.g., 200 of FIG. 2A, 300 of FIG. 3, or 400 of FIG. 4A) under small load conditions can minimize power (P) consumption, and minimize switching losses, while maintaining the output voltage $_{OUT}$ at a proper level.

FIG. 3 is a block diagram depicting a second general topology of a frequency modulated self-oscillating switching power supply (FMSOP) in accordance with embodiments of the present invention. The FMSOP 300 of FIG. 3 generally operates in the same manner as the FMSOP 200 of FIG. 2A except that in FMSOP 300 the input-current inductor coil and the output-current inductor coil are the same coil (L1) rather than two distinct coils. Thus, while operating in the critical conduction mode, the input-current inductor's current ($I_1$) ramps up (ON-time) to a peak value (e.g., $I_{TH}$), ramps down (OFF-time) to zero, and then immediately begins ramping up (ON-time) again. While the input-current ($I_1$) is ramping up, the input-output current inductor coil L1 is "charging" (i.e., storing energy) from the source $V_{IN}$. While the input-current ($I_1$) is ramping down, the switch SW1 is open and the input-output current inductor coil L1 is "discharging" energy and current into the capacitor C1, and through the load, through diode D1.

When the power switch (SW1) closes (beginning of ON-time), a voltage $V_1$ (i.e., $V_1$ is approximately equal to voltage $V_{IN}$) is asserted across coil L1 and current $I_1$ ramps up (from zero at the end of the previous cycle) through the switch SW1 as current $I_{ON}$, until a threshold current magnitude $I_{TH}$ is reached (i.e., $I_1=I_{ON}$ while SW1 is ON and $I_1<=I_{TH}$). During this ON-time ($t_{ON}$), a magnetic field builds up in the core (e.g., $T_{CORE}$) of the input-output current inductor coil L1 (which is shared with auxiliary secondary coil L3). When the power switch SW1 opens, which begins the OFF-time ($t_{OFF}$), the magnetic field collapses, and, according to Lenz's law, the voltage $V_1$ across the input-output current inductor (L1) reverses polarity and attains the voltage magnitude necessary (e.g., the sum of voltages $V_1+V_{IN}$ becomes greater than $_{OUT}$) to maintain the flow of current $I_1$ through the path of least resistance (e.g., through diode D1 and into capacitor C1). In this case, there is no secondary winding (as there was L2 in FMSOP 200 of FIG. 2A) offering a path of least resistance, and the current ($I_1$) has to find some way to continue its flow and to begin its decrease-for example, as current $I_{OFF}$ through diode D1 and into capacitor C1 and through the load.

The Zero Current Detector within or associated with the switch driver (e.g., 210) may indirectly sense a zero-current condition of current $I_1$ through the output-current inductor coil (L1) by monitoring an auxiliary voltage $V_{AUX}$ across a magnetically coupled auxiliary coil (e.g., auxiliary winding L3). A very small, (i.e., negligible) amount of the input energy is output as an auxiliary output current ($I_{AUX}$) and dissipated through a sensing circuit within or operatively coupled to the switch-driver circuit (e.g, 210). The FMSOP (300) of FIG. 3 can have the same load-modulated timing (e.g., $t_{OFFMIN}$) and switching frequency ($F_{SW}$) characteristics as were depicted in FIGS. 2D and 2E for the FMSOP (200) of FIG. 2A.

FIG. 4A is a block diagram depicting an alternative embodiment of the present invention wherein load-modulation of the small-load OFF-time ($t_{OFFSL}$) in the FMSOP (400) is performed with a voltage-controlled pulse generator (VCPG) included within the switch-driver 410 circuit. The FMSOP (400) of FIG. 4A may be constructed in accordance with the first general topology shown in FIG. 2A, or in accordance with the second general topology shown in FIG. 3. Thus, the input-current inductor coil (L1)

of the FMSOP (400) may be magnetically coupled to a separate output-current inductor coil (as in FMSOP 200 of FIG. 2A) or may be the same coil as the output-current inductor coil (as in FMSOP 300 of FIG. 3). An auxiliary coil (L3) magnetically coupled to the output-current inductor coil through a transformer core ($T_{CORE}$) provides the flyback signal (a signal indicating the zero-current condition in the output-current inductor coil) to support critical current mode operation.

The FMSOP (400) includes a (flyback) switch driver (410) which can be a modification of the Motorola MC33368 controller chip. In this embodiment, the frequency controller (420) external to the switch-driver 410 circuit may be simply implemented as a voltage divider comprised of two resistors ($R_{D1}$ & $R_{D2}$) connected between the output voltage ($_{OUT}$) and ground. The voltage divider's output line (441) is connected to a feedback (FB) pin of the switch-driver 410 circuit. The FB pin of the switch driver 410 may also be used for controlling a multiplier (134) and Output Overvoltage (132) circuits as in FIG. 1C of the related art. In various embodiments of the present invention, the Output Overvoltage circuit (132) present in the switch driver (110 of FIG. 1C) of the related art may not be needed, since the output voltage ($_{OUT}$) may be continuously monitored and regulated by the switching frequency modulating circuits of the present invention) and may be eliminated (see, e.g., switch driver 410 in FIG. 4B).

FIG. 4B is a block diagram depicting internal functions of the (flyback) switch driver (410) for the FMSOP 400 of FIG. 4A. The switch driver (410) can be fabricated on a single chip as a modification of a Motorola MC33368-based switch driver 210 of FIG. 2A. The voltage-controlled pulse generator (VCPG 416) outputs a pulse-width modulated (PWM) load-modulated OFFMIN-pulse ($P_{OFFMIN}$) having width $t_{OFFMIN}$. The VCPG (416) monitors the load, by monitoring the output voltage $_{OUT}$ through a voltage divider (see $R_{D1}$ and $R_{D2}$ of FIG. 4A), and outputs load-modulated OFFMIN-pulse ($P_{OFFMIN}$) having a width ($t_{OFFIN}$) that generally increases with decreasing load under small-load conditions. The load can also be monitored by monitoring the magnitude of current output from the FMSOP (e.g., at voltage $_{OUT}$). The load-modulated OFFMIN-pulse ($P_{OFFMIN}$) may be of the same form (e.g., same active-voltage, and same shape, rise/fall time, etc.) as the output of Frequency Clamp circuit (116) to the combinatorial logic gate (112) in the driver circuit 110 of FIG. 1C.

The load-modulated OFFMIN-pulse ($P_{OFFMIN}$) of width $t_{OFFMIN}$ thusly produced may be input directly to a combinatorial logic gate (e.g. 112) for inhibiting the activation of the output of the switch driver (e.g., 410) (i.e., for inhibiting the turning ON of the power switch SW1 thereby inhibiting the commencement of the next ON-time). The switch driver 410 including VCPG (416) requires fewer external components to perform the methods of the present invention, than the switch driver 210 of FIG. 2A. The load-modulated OFFMIN-pulse ($P_{OFFMIN}$) output by the VCPG (416) may be active-High or active-Low (depending upon whether the output of the switch driver 410 is active High or active Low), and is considered to be "inhibiting" while it is outputting a signal of width $t_{OFFMIN}$ that inhibits the beginning of the next ON-time.

In alternative embodiments, the load-modulated pulse ($P_{OFFMIN}$) having width $t_{OFFMIN}$ can be generated by a digitally controlled programable pulse generator (PPG) circuit of the related art (e.g., TTL-interfaced 8-bit PPG model PPG38F manufactured by data delay devices, inc., of Clifton, N.J.) that is operatively coupled (e.g., directly connected pin-to-pin, or through a look-up table, or through a microprocessor, etc.) to an analog-to-digital converter (ADC) which monitors the load. The ADC can be configured to sense the load by sensing the output voltage $_{OUT}$, for example, through a voltage divider (see, e.g., voltage divider $R_{D1}$ & $R_{D2}$ in FIG. 4A). The load-modulated OFFMIN-pulse ($P_{OFFMIN}$) of width $t_{OFFMIN}$ thusly produced may then be input directly to a combinatorial logic gate (e.g. 112 of FIG. 4B) for inhibiting the activation of the output of the switch driver (e.g., 410) (i.e., for inhibiting the turning ON of the power switch SW1 thereby inhibiting the commencement of the next ON-time).

In other alternative embodiments, either a voltage controlled pulse generator (e.g., a VCPG as in FIG. 4B) or a digitally controlled programable pulse generator (PPG) may be used to delay the commencement of the next ON-time by being configured to implement a selectively triggered delay-block between the output of the combinatorial logic gate (112) (i.e., instead of as an input to gate 112), and the buffer 114. The delay block may follow buffer 114 or even include buffer 114, and therefore may be connected between the combinatorial logic gate 112 and the power switch SW1. The voltage-controlled delay block would pass either a rising (or falling) edge signal (i.e., the signal causing the commencement of the ON-time) without delay, but would delay the falling (or rising) edge signal (i.e., the signal causing the commencement of the OFF-time) by an amount of time ($t_{OFFDELAY}$) that increases with decreasing load, such that $t_{OFF} = t_{AUX} + t_{OFFDELAY}$. The delay time $t_{OFFDELAY}$ equals "dead time." Thus, $t_{OFFDELAY}=0$ when critical current mode operation is desired. The delay-block would have the equivalent function of a combinatorial logic gate (e.g., a NAND-gate or AND-gate, etc., at the output of combinatorial logic gate 112), passing the "ON" voltage signal as soon as and while it is expressed at the delay block's input, but suppressing the propagation of the "OFF" voltage signal until an inhibiting signal of duration $t_{OFFDELAY}$ has ceased to be asserted in or to the delay block. As previously noted, this arrangement (cascaded combinatorial logic gates) provides an equivalent combinatorial logic gate that is functionally equivalent in material aspects to combinatorial logic gate (112) with each of its original inputs (e.g., Q from flip-flop 418, and pulse $P_{OFFMIN}$ from a VCPG or a PPG.

While various certain embodiments of the present invention have been disclosed, a person of ordinary skill in the art would realize that certain modifications would come within the teachings of the present invention. Therefore, the claims which follow should be studied to determine the true scope and content of the present invention.

We claim:

1. A switching power supply having an output voltage ($V_{OUT}$) for supplying a supply current to a dynamically variable load, the switching power supply comprising:

an input-current inductor coil connected in series with an input voltage source ($V_{IN}$) and a power switch;

an output-current inductor coil for outputting an output current at at least the output voltage ($V_{OUT}$);

a zero-current detector having a detector-output being activated when the output current falls to zero;

a switch-driver circuit for closing and opening the power switch, the switch-driver circuit including:

a flip-flop adapted to latch the activated detector-output and having a first flip-flop input connected to the detector-output, and having a flip-flop output, the flip-flop output being activated while the activated detector-output is latched;

a combinatorial logic gate, having a first logic gate input connected to the flip-flop output and a second logic gate input and a logic gate output, the logic gate output being activated if the flip-flop output is activated and if the second logic gate input is not inhibited, the power switch being closed while the logic gate output is activated;

a pulse generator having a pulse generator-output for outputting an OFF-pulse having a dynamically variable load-modulated pulse width that corresponds to the dynamically variable load, the pulse generator-output being connected to the second logic gate input and inhibiting the second logic gate input during the pulse-width of the load-modulated OFF-pulse.

2. The switching power supply of claim 1, wherein the input-current inductor coil and the output-current inductor coil are the same coil.

3. The switching power supply of claim 2, further comprising a transformer core, wherein the output-current inductor coil and an auxiliary coil for sensing a zero-current condition in the output-current inductor coil are wound around the transformer core.

4. The switching power supply of claim 3, wherein the auxiliary coil and the zero-current detector are operatively connected.

5. The switching power supply of claim 3, wherein the zero-current detector is activated when the auxiliary coil senses a zero-current condition in the output-current inductor coil.

6. The switching power supply of claim 1, wherein the input-current inductor coil and the output-current inductor coil are distinct coils that are magnetically coupled together.

7. The switching power supply of claim 6, wherein the input-current inductor coil is a primary winding of a transformer, and the output-current inductor coil is a secondary winding of the transformer.

8. The switching power supply of claim 7, wherein the transformer further comprises an auxiliary coil for sensing a zero-current condition in the output-current inductor coil.

9. The switching power supply of claim 8, wherein the zero-current detector is activated then the auxiliary coil senses a zero-current condition in the output-current inductor coil.

10. A method for operating a switching power supply adapted to supply a load current through a dynamically variable load, the method comprising:

operating the supply in discontinuous current mode (DCM) while the supply is supplying load current having a first load current magnitude, and increasing the extent ($E_{DCM}$) that the supply operates in DCM as the load current decreases from the first load current magnitude; and operating the supply in critical current mode while the supply is supplying load current having a second load current magnitude that is larger than the first load current magnitude.

11. The method of claim 10, further comprising determining the magnitude of the load current by measuring the output voltage of the supply, wherein operating the supply in critical current mode includes operating the supply in a self-oscillating mode of operation.

12. The method of claim 10, wherein operating the supply in discontinuous current mode (DCM) under small-load conditions includes providing a switch driver circuit having a combinatorial logic gate adapted to delay the commencement of an ON-time of a power switch, wherein increasing the extent that the supply operates in DCM as the load decreases includes generating a pulse width modulated pulse having a width that increases as the load decreases, and wherein the pulse is input to the combinatorial logic gate.

13. The method of claim 10, wherein operating the supply in critical current mode includes detecting a zero-current condition in an output-current inductor coil of the supply.

14. The method of claim 13, wherein detecting a zero-current condition in the output-current inductor coil of the supply includes magnetically coupling the output-current inductor coil of the power supply to an auxiliary coil of the power supply.

15. A switching power supply adapted to operate in a critical conduction mode and in a discontinuous conduction mode, comprising:

a power switch connected in series to an input-current inductor coil and operatively coupled to an output-current inductor coil, the power switch adapted to interrupt an input current through the input-current inductor coil, the power switch being either in an OFF or an ON state and conducting the input current when in its ON state;

a switching controller adapted to control the state of the power switch, the switching controller being operatively coupled to:

a first feedback signal for indicating a zero-current condition in the output-current inductor coil, wherein the switching controller turns the power switch ON in response to the first feedback signal while the supply operates in the critical conduction mode;

a second feedback signal indicating a threshold current magnitude in the input-current inductor coil, wherein the switching controller turns the power switch OFF in response to the second feedback signal; and a third feedback signal, wherein the switching controller holds the power switch OFF notwithstanding the first feedback signal during a dynamically variable OFF-time that is varied in response to the third feedback signal while the supply operates in the discontinuous conduction mode.

16. The switching power supply of claim 15, wherein the critical conduction mode is associated with a normal self-oscillating mode of operation of the switching power supply and the discontinuous conduction mode is associated with a reduced power consumption mode of operation of the switching power supply.

17. The switching power supply of claim 15, wherein the dynamically variable OFF-time increases because the magnitude of a supply current output from the power supply decreases.

18. The switching power supply of claim 15, wherein the input-current inductor coil and the output-current inductor coil are distinct coils that are magnetically coupled together.

19. The switching power supply of claim 15, wherein the third feedback signal is a pulse width modulated (PWM) signal having a width that is about equal to the OFF-time.

20. The switching power supply of claim 19, wherein the third feedback signal varies in response to changes in an output voltage of the switching power supply.

* * * * *